United States Patent
Arai et al.

(10) Patent No.: US 9,418,452 B2
(45) Date of Patent: Aug. 16, 2016

(54) PRINT MEDIUM DISPLAYING ILLUSION IMAGE AND NON-TRANSITORY COMPUTER-READABLE RECORDING MEDIUM HOLDING ILLUSION IMAGE DATA

(71) Applicant: National Institute of Japan Science and Technology Agency, Kawaguchi-shi, Saitama (JP)

(72) Inventors: Hitoshi Arai, Tokyo (JP); Shinobu Arai, Tokyo (JP)

(73) Assignee: NATIONAL INSTITUTE OF JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 0 days.

(21) Appl. No.: 14/485,870

(22) Filed: Sep. 15, 2014

(65) Prior Publication Data
US 2015/0055885 A1 Feb. 26, 2015

Related U.S. Application Data

(63) Continuation of application No. 13/874,641, filed on May 1, 2013, now Pat. No. 8,873,879, which is a continuation of application No. PCT/JP2011/076747, filed on Nov. 15, 2011.

(30) Foreign Application Priority Data

Nov. 15, 2010 (JP) ................. 2010-254576

(51) Int. Cl.
*G06T 11/00* (2006.01)
*G06T 11/60* (2006.01)
*B44F 1/00* (2006.01)

(52) U.S. Cl.
CPC ............... *G06T 11/003* (2013.01); *B44F 1/00* (2013.01); *G06T 11/60* (2013.01);
(Continued)

(58) Field of Classification Search
CPC ............... G06F 17/147; G06F 17/148; G06T 2207/20064; G06T 11/00; G06T 11/003; G06T 2207/20016; G06T 5/002; G06T 5/10; G06K 9/40; H04N 19/00818
See application file for complete search history.

(56) References Cited

U.S. PATENT DOCUMENTS 4,885,193 A * 12/1989 Head .............................. 428/14
5,526,446 A 6/1996 Adelson et al.
(Continued)

FOREIGN PATENT DOCUMENTS

CN 101114336 A 1/2008
CN 101201937 A 6/2008
(Continued)

OTHER PUBLICATIONS

B. Pinna and G. J. Brelstaff, "A New Visual Illusion of Relative Motion," Version Research, vol. 40, pp. 2091-2096, (2000).
(Continued)

*Primary Examiner* — Vu Le
*Assistant Examiner* — Guillermo Rivera-Martinez

(57) ABSTRACT

The present invention obtains subband signals by performing a multiresolution decomposition by a wavelet frame with orientation selectivity or a filterbank with orientation selectivity that is a set of an approximate filter with no orientation and a plurality of detail filters with respective orientations on image data, and, when an image is reconstructed by summing the obtained subband signals, generates reconstructed image data that creates a floating illusion by attenuating or amplifying a subband signal corresponding to at least one of detail filters with a predetermined orientation relative to a floating direction, in which an image is desired to be floated due to an illusion, among the detail filters.

17 Claims, 33 Drawing Sheets
(9 of 33 Drawing Sheet(s) Filed in Color)

(52) U.S. Cl.
CPC ............... *G06T 2207/10024* (2013.01); *G06T 2207/20016* (2013.01); *G06T 2207/20024* (2013.01); *G06T 2207/20064* (2013.01)

(56) References Cited

U.S. PATENT DOCUMENTS

| | | | |
|---|---|---|---|
| 7,136,522 B2 * | 11/2006 | Harrington et al. | 382/166 |
| 8,301,013 B2 | 10/2012 | Yamashita | |
| 8,343,615 B2 * | 1/2013 | Raksha et al. | 428/195.1 |
| 8,369,890 B2 * | 2/2013 | Nicolas | 455/556.1 |
| 8,385,640 B2 * | 2/2013 | Kurtz et al. | 382/166 |
| 2009/0074275 A1 | 3/2009 | Ruanaidh | |
| 2009/0156970 A1 * | 6/2009 | Sullivan | 601/37 |
| 2009/0273843 A1 | 11/2009 | Raskar | |
| 2013/0021435 A1 | 1/2013 | Yamashita | |

FOREIGN PATENT DOCUMENTS

| | | |
|---|---|---|
| JP | 2006-041744 A | 2/2006 |
| JP | 2007-018379 A | 1/2007 |
| JP | 2008-103785 A | 5/2008 |
| JP | 2009-534665 A | 9/2009 |
| JP | 2010-171624 A | 8/2010 |
| RU | 2273038 C2 | 3/2006 |
| TW | 201032577 A1 | 9/2010 |
| WO | 01/63341 A1 | 8/2001 |
| WO | 2007/121454 A1 | 10/2007 |

OTHER PUBLICATIONS

R. Gurnsey and G. Page "Effects of Local and Global Factors in the Pinna Illusion," Vision Research, vol. 46, pp. 1823-1837, (2006).
Hitoshi Arai, "Collection of Illusionary Figures for Mathematical Research on Vision," Sanshusha Co. Ltd. (2007).
Hiroshi Arai and Shinobu Arai, "2D Tight Framelets with Orientation Selectivity Suggested by Vision Science," JSIAM Letters, vol. 1, pp. 9-12 (2009).
Hiroshi Arai and Shinobu Arai, "Finite Discrete, Shift-Invariant, Directional Filterbanks for Visual Information Processing, I: Construction," Interdisciplinary Information Sciences, vol. 13, No. 2, pp. 255-273 (2007).
Akiyoshi Kitaoka, "Illusion Introduction," Asakura Publishing Co., Ltd. pp. 080 and 090 (2010).
Hajime Ouchi, "Japanese Optical and Geometrical Art," Dover Publications, Inc., p. 75, (1973) New York.
Hitoshi Arai, "Shikaku no Kagaku to Sugaku Wavelet de Saguru Sakushi no Sekai Dai 4 Kai Sakushi Hassei no Simulation / Atarashii Wavelet Frame no Kaihatsu," Mathematical Sciences, vol. 46, No. 11, pp. 72-77, Nov. 1, 2008.
Hitoshi Arai, "Shikaku no Kagaku to Sugaku Wavelet de Saguru Sakushi no Sekai Dai 1 Kai Shikaku no Suri Model to Wavelet," Mathematical Sciences, vol. 46, No. 8, pp. 64-69, Aug. 1, 2008.
The Intellectual Property Office of ROC (Taiwan), "Office Action" and "Search Report," issued in Taiwanese Patent Application No. 100141575, which is a Taiwanese counterpart application to U.S. Appl. No. 13/874,641, with an issuance date of Aug. 28, 2013.
China Patent and Trademark Office (China) "Office Action" and "Search Report," issued in Chinese Patent Application No. 201180055042.X which is a Chinese counterpart application to U.S. Appl. No. 13/874,641, with an issuance date of Aug. 27, 2013.
Decision of Grant mailed on Jun. 3, 2014, in Russian Patent Application No. 2013127302, which is a Russian counterpart application of U.S. Appl. No. 13/874,641.
European Patent Office, Communication of Extended European Search Report, issued on Jul. 1, 2014, in EP 11841428.3, which is a European counterpart of U.S. Appl. No. 13/874,641.
Xavier Otazu et al., "Multiresolution Wavelet Framework Models Brightness Induction Effects", Vision Research, vol. 48, pp. 733-751 (2008).
Hitoshi Arai, "A Nonlinear Model of Visual Information Processing Based on Discrete Maximal Overlap Wavelets", Interdisciplinary Information Sciences, vol. 11, No. 2, pp. 177-190 (2005).
Freeman et al., "Steerable Filters and Local Analysis of Image Structure", Jun. 1992, Massachusetts Institute of Technology, Doc. Thesis, pp. 1-133.
Fermüller et al., "Uncertainty in visual processes predicts geometrical optical illusions", 2004, Vision Research, vol. 44, pp. 727-749.
Murakami et al., "A positive correlation between fixation instability and the strength of illusory motion in a static display", Jul. 2006, Vision Research, vol. 46, pp. 2421-243.
Chi et al., "Self-Animating Images: Illusory Motion Using Repeated Asymmetric Patterns", Aug. 2008, ACM Transactions on Graphics, vol. 27, No. 3, Article 62, pp. 62:1-8.

* cited by examiner

FIG.5

| $d_k(1)$ | $d_k(2)$ | $d_k(3)$ | $d_k(4)$ | $d_k(5)$ | $d_k(6)$ | $d_k(7)$ | $a_k$ |
|---|---|---|---|---|---|---|---|
| $d_k(8)$ | $d_k(9)$ | $d_k(10)$ | $d_k(11)$ | $d_k(12)$ | $d_k(13)$ | $d_k(14)$ | $d_k(15)$ |
| $d_k(16)$ | $d_k(17)$ | $d_k(18)$ | $d_k(19)$ | $d_k(20)$ | $d_k(21)$ | $d_k(22)$ | $d_k(23)$ |
| $d_k(24)$ | $d_k(25)$ | $d_k(26)$ | $d_k(27)$ | $d_k(28)$ | $d_k(29)$ | $d_k(30)$ | $d_k(31)$ |
| $d_k(32)$ | $d_k(33)$ | $d_k(34)$ | $d_k(35)$ | $d_k(36)$ | $d_k(37)$ | $d_k(38)$ | $d_k(39)$ |
| $d_k(40)$ | $d_k(41)$ | $d_k(42)$ | $d_k(43)$ | $d_k(44)$ | $d_k(45)$ | $d_k(46)$ | $d_k(47)$ |
| $d_k(48)$ | $d_k(49)$ | $d_k(50)$ | $d_k(51)$ | $d_k(52)$ | $d_k(53)$ | $d_k(54)$ | $d_k(55)$ |
| $d_k(56)$ | $d_k(57)$ | $d_k(58)$ | $d_k(59)$ | $d_k(60)$ | $d_k(61)$ | $d_k(62)$ | $d_k(63)$ |
| $d_k(64)$ | $d_k(65)$ | $d_k(66)$ | $d_k(67)$ | $d_k(68)$ | $d_k(69)$ | | |
| $d_k(70)$ | $d_k(71)$ | $d_k(72)$ | $d_k(73)$ | $d_k(74)$ | $d_k(75)$ | | |
| $d_k(76)$ | $d_k(77)$ | $d_k(78)$ | $d_k(79)$ | $d_k(80)$ | $d_k(81)$ | | |
| $d_k(82)$ | $d_k(83)$ | $d_k(84)$ | $d_k(85)$ | $d_k(86)$ | $d_k(87)$ | | |
| $d_k(88)$ | $d_k(89)$ | $d_k(90)$ | $d_k(91)$ | $d_k(92)$ | $d_k(93)$ | | |
| $d_k(94)$ | $d_k(95)$ | $d_k(96)$ | $d_k(97)$ | $d_k(98)$ | $d_k(99)$ | | |

FIG.6

| $a_k$ | $b_{k,7}$ | $b_{k,6}$ | $b_{k,5}$ | $b_{k,4}$ | $b_{k,3}$ | $b_{k,2}$ | $b_{k,1}$ |
| $b_{k,15}$ | $b_{k,14}$ | $b_{k,13}$ | $b_{k,12}$ | $b_{k,11}$ | $b_{k,10}$ | $b_{k,9}$ | $b_{k,8}$ |
| $b_{k,23}$ | $b_{k,22}$ | $b_{k,21}$ | $b_{k,20}$ | $b_{k,19}$ | $b_{k,18}$ | $b_{k,17}$ | $b_{k,16}$ |
| $b_{k,31}$ | $b_{k,30}$ | $b_{k,29}$ | $b_{k,28}$ | $b_{k,27}$ | $b_{k,26}$ | $b_{k,25}$ | $b_{k,24}$ |
| $b_{k,39}$ | $b_{k,38}$ | $b_{k,37}$ | $b_{k,36}$ | $b_{k,35}$ | $b_{k,34}$ | $b_{k,33}$ | $b_{k,32}$ |
| $b_{k,47}$ | $b_{k,46}$ | $b_{k,45}$ | $b_{k,44}$ | $b_{k,43}$ | $b_{k,42}$ | $b_{k,41}$ | $b_{k,40}$ |
| $b_{k,55}$ | $b_{k,54}$ | $b_{k,53}$ | $b_{k,52}$ | $b_{k,51}$ | $b_{k,50}$ | $b_{k,49}$ | $b_{k,48}$ |
| $b_{k,63}$ | $b_{k,62}$ | $b_{k,61}$ | $b_{k,60}$ | $b_{k,59}$ | $b_{k,58}$ | $b_{k,57}$ | $b_{k,56}$ |

| $b_{k,69}$ | $b_{k,68}$ | $b_{k,67}$ | $b_{k,66}$ | $b_{k,65}$ | $b_{k,64}$ |
| $b_{k,75}$ | $b_{k,74}$ | $b_{k,73}$ | $b_{k,72}$ | $b_{k,71}$ | $b_{k,70}$ |
| $b_{k,81}$ | $b_{k,80}$ | $b_{k,79}$ | $b_{k,78}$ | $b_{k,77}$ | $b_{k,76}$ |
| $b_{k,87}$ | $b_{k,86}$ | $b_{k,85}$ | $b_{k,84}$ | $b_{k,83}$ | $b_{k,82}$ |
| $b_{k,93}$ | $b_{k,92}$ | $b_{k,91}$ | $b_{k,90}$ | $b_{k,89}$ | $b_{k,88}$ |
| $b_{k,99}$ | $b_{k,98}$ | $b_{k,97}$ | $b_{k,96}$ | $b_{k,95}$ | $b_{k,94}$ |

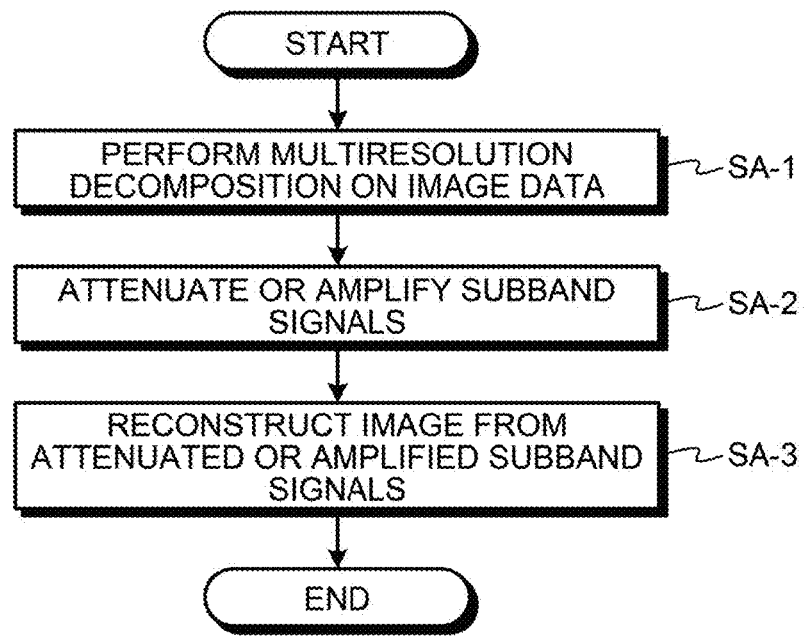

FIG.10

Japan Science and Technology Agency

FIG.11

| 1 | 1 | 1 | 1 | 1 | 1 | 1 | A |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 1 | 1 | 1 | 1 | 1 | 1 | 0 |

| 2 | 1 | 1 | 1 | 1 | 1 |
| 1 | 2 | 1 | 1 | 1 | 1 |
| 1 | 1 | 2 | 1 | 1 | 1 |
| 1 | 1 | 1 | 2 | 1 | 1 |
| 1 | 1 | 1 | 1 | 2 | 1 |
| 1 | 1 | 1 | 1 | 1 | 2 |

| 1 | 1 | 1 | 1 | 1 | 1 | 1 | A |   | 0 | 0 | 0 | 0 | 0 | 0 |
|---|---|---|---|---|---|---|---|---|---|---|---|---|---|---|
| 1 | 1 | 1 | 1 | 1 | 1 | 2 | 0 |   | 0 | 0 | 0 | 0 | 0 | 0 |
| 1 | 1 | 1 | 1 | 1 | 2 | 1 | 0 |   | 0 | 0 | 0 | 0 | 0 | 0 |
| 1 | 1 | 1 | 1 | 2 | 1 | 1 | 0 |   | 0 | 0 | 0 | 0 | 0 | 0 |
| 1 | 1 | 1 | 2 | 1 | 1 | 1 | 0 |   | 0 | 0 | 0 | 0 | 0 | 0 |
| 1 | 1 | 2 | 1 | 1 | 1 | 1 | 0 |   | 0 | 0 | 0 | 0 | 0 | 0 |
| 1 | 2 | 1 | 1 | 1 | 1 | 1 | 0 |   | 0 | 0 | 0 | 0 | 0 | 0 |
| 1 | 1 | 1 | 1 | 1 | 1 | 1 | 0 |   |   |   |   |   |   |   |

| 0 | 0 | 0 | 0 | 0 | 0 | 0 | A |   | 2 | 1 | 1 | 1 | 1 | 1 |
| 1 | 0 | 0 | 0 | 0 | 0 | 0 | 1 |   | 1 | 2 | 1 | 1 | 1 | 1 |
| 1 | 0 | 0 | 0 | 0 | 0 | 0 | 1 |   | 1 | 1 | 2 | 1 | 1 | 1 |
| 1 | 0 | 0 | 0 | 0 | 0 | 0 | 1 |   | 1 | 1 | 1 | 2 | 1 | 1 |
| 1 | 0 | 0 | 0 | 0 | 0 | 0 | 1 |   | 1 | 1 | 1 | 1 | 2 | 1 |
| 1 | 0 | 0 | 0 | 0 | 0 | 0 | 1 |   | 1 | 1 | 1 | 1 | 1 | 2 |
| 1 | 0 | 0 | 0 | 0 | 0 | 0 | 1 |   |   |   |   |   |   |   |
| 1 | 1 | 1 | 1 | 1 | 1 | 1 |   |   |   |   |   |   |   |   |

| 0 | 0 | 0 | 0 | 0 | 0 | 0 | A |
|---|---|---|---|---|---|---|---|
| 1 | 0 | 0 | 0 | 0 | 0 | 0 | 1 |
| 1 | 1 | 0 | 0 | 0 | 0 | 1 | 1 |
| 1 | 1 | 1 | 0 | 0 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

| $M_1$ | 1     | 1     | 1     | 1     | 1     |
|-------|-------|-------|-------|-------|-------|
| 1     | $M_2$ | 1     | 1     | 1     | 1     |
| 1     | 1     | $M_3$ | 1     | 1     | 1     |
| 1     | 1     | 1     | $M_4$ | 1     | 1     |
| 1     | 1     | 1     | 1     | $M_5$ | 1     |
| 1     | 1     | 1     | 1     | 1     | $M_6$ |

FIG.27

| 0 | 0 | 0 | 0 | 0 | 0 | 0 | A |
|---|---|---|---|---|---|---|---|
| 1 | 1 | 1 | 1 | 1 | 1 | $M_1$ | 1 |
| 1 | 1 | 1 | 1 | 1 | $M_2$ | 1 | 1 |
| 1 | 1 | 1 | 1 | $M_3$ | 1 | 1 | 1 |
| 1 | 1 | 1 | $M_4$ | 1 | 1 | 1 | 1 |
| 1 | 1 | $M_5$ | 1 | 1 | 1 | 1 | 1 |
| 1 | $M_6$ | 1 | 1 | 1 | 1 | 1 | 1 |
| 1 | 1 | 1 | 1 | 1 | 1 | 1 | 1 |

| 0 | 0 | 0 | 0 | 0 | 0 |
|---|---|---|---|---|---|
| 1 | 0 | 0 | 0 | 0 | 1 |
| 1 | 1 | 0 | 0 | 1 | 1 |
| 1 | 1 | 1 | 1 | 1 | 1 |
| 1 | 1 | 1 | 1 | 1 | 1 |
| 1 | 1 | 1 | 1 | 1 | 1 |

FIG.28

| 1 | 1 | 1 | 1 | 1 | 1 | 1 | A |
|---|---|---|---|---|---|---|---|
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 1 | 0 | 0 |
| 1 | 1 | 1 | 1 | 1 | 1 | 1 | 0 |

| $M_1$ | 1 | 1 | 1 | 1 | 1 |
|---|---|---|---|---|---|
| 1 | $M_2$ | 1 | 1 | 1 | 1 |
| 1 | 1 | $M_3$ | 1 | 1 | 1 |
| 1 | 1 | 1 | $M_4$ | 1 | 1 |
| 1 | 1 | 1 | 1 | $M_5$ | 1 |
| 1 | 1 | 1 | 1 | 1 | $M_6$ |

FIG.29

| 1 | 1 | 1 | 1 | 1 | 1 | 1 | A |
|---|---|---|---|---|---|---|---|
| 1 | 1 | 1 | 1 | 1 | 1 | $M_1$ | 0 |
| 1 | 1 | 1 | 1 | 1 | $M_2$ | 1 | 0 |
| 1 | 1 | 1 | 1 | $M_3$ | 1 | 1 | 0 |
| 1 | 1 | 1 | $M_4$ | 1 | 1 | 1 | 0 |
| 1 | 1 | $M_5$ | 1 | 1 | 1 | 1 | 0 |
| 1 | $M_6$ | 1 | 1 | 1 | 1 | 1 | 0 |
| 1 | 1 | 1 | 1 | 1 | 1 | 1 | 0 |

| 0 | 1 | 1 | 1 | 1 | 1 |
|---|---|---|---|---|---|
| 0 | 0 | 1 | 1 | 1 | 1 |
| 0 | 0 | 0 | 1 | 1 | 1 |
| 0 | 0 | 0 | 1 | 1 | 1 |
| 0 | 0 | 1 | 1 | 1 | 1 |
| 0 | 1 | 1 | 1 | 1 | 1 |

FIG.30

| 0 | 0 | 0 | 0 | 0 | 0 | 0 | A |
|---|---|---|---|---|---|---|---|
| 1 | 0 | 0 | 0 | 0 | 0 | 0 | 1 |
| 1 | 0 | 0 | 0 | 0 | 0 | 0 | 1 |
| 1 | 0 | 0 | 0 | 0 | 0 | 0 | 1 |
| 1 | 0 | 0 | 0 | 0 | 0 | 0 | 1 |
| 1 | 0 | 0 | 0 | 0 | 0 | 0 | 1 |
| 1 | 0 | 0 | 0 | 0 | 0 | 0 | 1 |
| 1 | 1 | 1 | 1 | 1 | 1 | 1 | 1 |

| $M_1$ | 1 | 1 | 1 | 1 | 1 |
|---|---|---|---|---|---|
| 1 | $M_2$ | 1 | 1 | 1 | 1 |
| 1 | 1 | $M_3$ | 1 | 1 | 1 |
| 1 | 1 | 1 | $M_4$ | 1 | 1 |
| 1 | 1 | 1 | 1 | $M_5$ | 1 |
| 1 | 1 | 1 | 1 | 1 | $M_6$ |

FIG.31

| 0 | 0 | 0 | 0 | 0 | 0 | 0 | A |
|---|---|---|---|---|---|---|---|
| 1 | 1 | 1 | 1 | 1 | 1 | $M_1$ | 1 |
| 1 | 1 | 1 | 1 | 1 | $M_2$ | 1 | 1 |
| 1 | 1 | 1 | 1 | $M_3$ | 1 | 1 | 1 |
| 1 | 1 | 1 | $M_4$ | 1 | 1 | 1 | 1 |
| 1 | 1 | $M_5$ | 1 | 1 | 1 | 1 | 1 |
| 1 | $M_6$ | 1 | 1 | 1 | 1 | 1 | 1 |
| 1 | 1 | 1 | 1 | 1 | 1 | 1 | 1 |

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG.32

| 1 | 1 | 1 | 1 | 1 | 1 | 1 | A | | | | | | |
|---|---|---|---|---|---|---|---|---|---|---|---|---|---|
| 1 | 0 | 0 | 0 | 0 | 0 | 0 | 0 | $M_1$ | 1 | 1 | 1 | 1 | 1 |
| 1 | 0 | 0 | 0 | 0 | 0 | 0 | 0 | 1 | $M_2$ | 1 | 1 | 1 | 1 |
| 1 | 0 | 0 | 0 | 0 | 0 | 0 | 0 | 1 | 1 | $M_3$ | 1 | 1 | 1 |
| 1 | 0 | 0 | 0 | 0 | 0 | 0 | 0 | 1 | 1 | 1 | $M_4$ | 1 | 1 |
| 1 | 0 | 0 | 0 | 0 | 0 | 0 | 0 | 1 | 1 | 1 | 1 | $M_5$ | 1 |
| 1 | 0 | 0 | 0 | 0 | 0 | 0 | 0 | 1 | 1 | 1 | 1 | 1 | $M_6$ |
| 1 | 1 | 1 | 1 | 1 | 1 | 1 | 0 | | | | | | |

FIG.33

| 1 | 1 | 1 | 1 | 1 | 1 | 1 | A | | | | | | |
|---|---|---|---|---|---|---|---|---|---|---|---|---|---|
| 1 | 1 | 1 | 1 | 1 | 1 | $M_1$ | 0 | 0 | 0 | 0 | 0 | 0 | 0 |
| 1 | 1 | 1 | 1 | 1 | $M_2$ | 1 | 0 | 0 | 0 | 0 | 0 | 0 | 0 |
| 1 | 1 | 1 | 1 | $M_3$ | 1 | 1 | 0 | 0 | 0 | 0 | 0 | 0 | 0 |
| 1 | 1 | 1 | $M_4$ | 1 | 1 | 1 | 0 | 0 | 0 | 0 | 0 | 0 | 0 |
| 1 | 1 | $M_5$ | 1 | 1 | 1 | 1 | 0 | 0 | 0 | 0 | 0 | 0 | 0 |
| 1 | $M_6$ | 1 | 1 | 1 | 1 | 1 | 0 | 0 | 0 | 0 | 0 | 0 | 0 |
| 1 | 1 | 1 | 1 | 1 | 1 | 1 | 0 | | | | | | |

FIG.34

| 0 | 0 | 0 | 0 | 0 | 0 | 0 | A |
|---|---|---|---|---|---|---|---|
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 1 | 1 | 1 | 1 | 1 | 1 | 0 |

| $M_1$ | 1 | 1 | 1 | 1 | 1 |
|---|---|---|---|---|---|
| 1 | $M_2$ | 1 | 1 | 1 | 1 |
| 1 | 1 | $M_3$ | 1 | 1 | 1 |
| 1 | 1 | 1 | $M_4$ | 1 | 1 |
| 1 | 1 | 1 | 1 | $M_5$ | 1 |
| 1 | 1 | 1 | 1 | 1 | $M_6$ |

FIG.35

| 0 | 0 | 0 | 0 | 0 | 0 | 0 | A |
|---|---|---|---|---|---|---|---|
| 1 | 1 | 1 | 1 | 1 | 1 | $M_1$ | 0 |
| 1 | 1 | 1 | 1 | 1 | $M_2$ | 1 | 0 |
| 1 | 1 | 1 | 1 | $M_3$ | 1 | 1 | 0 |
| 1 | 1 | 1 | $M_4$ | 1 | 1 | 1 | 0 |
| 1 | 1 | $M_5$ | 1 | 1 | 1 | 1 | 0 |
| 1 | $M_6$ | 1 | 1 | 1 | 1 | 1 | 0 |
| 1 | 1 | 1 | 1 | 1 | 1 | 1 | 0 |

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG.45

| 0 | 0 | 0 | 0 | 0 | 0 | 0 | A |
|---|---|---|---|---|---|---|---|
| 0 | 0 | 0 | 0 | 0 | 0 | 0 | 2 |
| 0 | 0 | 0 | 0 | 0 | 0 | 1 | 2 |
| 0 | 0 | 0 | 0 | 0 | 1 | 1 | 2 |
| 0 | 0 | 0 | 0 | 1 | 1 | 1 | 2 |
| 0 | 0 | 0 | 1 | 1 | 1 | 1 | 2 |
| 0 | 0 | 1 | 1 | 1 | 1 | 1 | 2 |
| 0 | 1 | 1 | 1 | 1 | 1 | 1 | 2 |

| 0 | 0 | 0 | 0 | 0 | 0 |
|---|---|---|---|---|---|
| 1 | 0 | 0 | 0 | 0 | 0 |
| 1 | 1 | 0 | 0 | 0 | 0 |
| 1 | 1 | 1 | 0 | 0 | 0 |
| 1 | 1 | 1 | 1 | 0 | 0 |
| 1 | 1 | 1 | 1 | 1 | 0 |

FIG.46

| 2 | 2 | 2 | 2 | 2 | 2 | 2 |
|---|---|---|---|---|---|---|
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |

| 0 | 1 | 1 | 1 | 1 | 1 |
|---|---|---|---|---|---|
| 0 | 0 | 1 | 1 | 1 | 1 |
| 0 | 0 | 0 | 1 | 1 | 1 |
| 0 | 0 | 0 | 0 | 1 | 1 |
| 0 | 0 | 0 | 0 | 0 | 1 |
| 0 | 0 | 0 | 0 | 0 | 0 |

PRINT MEDIUM DISPLAYING ILLUSION IMAGE AND NON-TRANSITORY COMPUTER-READABLE RECORDING MEDIUM HOLDING ILLUSION IMAGE DATA

CROSS-REFERENCE TO RELATED APPLICATIONS

This patent application is a continuation under 35 U.S.C. §111(a) of co-pending U.S. application Ser. No. 13/874,641 filed on May 1, 2013, which is a continuation under 35 U.S.C. §111(a) of International Patent Application No. PCT/JP2011/076747 filed on Nov. 15, 2011, and designating the U.S. among other countries, which claims the benefit of foreign priority to Japanese Patent Application No. JP 2010-254576 filed on Nov. 15, 2010, the disclosures of all of which are hereby incorporated by reference in their entireties. The International Application was published in Japanese on May 24, 2012, as International Publication No. WO 2012/067254 A1 under PCT Article 21(2).

FIELD

The present invention relates to an illusion image generating apparatus, a medium, image data, an illusion image generating method, a printing medium manufacturing method, and a program.

BACKGROUND

Conventionally, figures and the like that create an optical illusion have been discovered. For example, illusion figures, such as a Hermann grid, a Chevreul illusion, a Cafe Wall illusion, an Ouchi illusion, a Pinna illusion, and a Gurnsey-Morgan illusion, have been discovered, and an illusion phenomenon is induced by viewing these illusion figures, illusions such as the size, position, color, or the like being perceived differently from reality, a non-existent object being seen, and a still image appearing to move (see Non Patent Literature 1, 4, 5, 6, and 7).

Moreover, conventionally, wavelet frames with orientation selectivity referred to as a pinwheel wavelet frame (see Non Patent Literature 3), a simple pinwheel framelet (see Non Patent Literature 2), and a pinwheel framelet have been developed as mathematical models of simple cells in the human visual cortex, and are used for image analysis and the like.

CITATION LIST

Non Patent Literature

Non Patent Literature 1: Hitoshi Arai "Illusion Figures", Sanshusha Co. Ltd., 2007
Non Patent Literature 2: Hitoshi Arai and Shinobu Arai, "2D tight framelets with orientation selectivity suggested by vision science", JSIAM Letters Vol. 1 (2009), pp. 9-12.
Non Patent Literature 3: Hitoshi Arai and Shinobu Arai, "Finite discrete, shift-invariant, directional filterbanks for visual information processing, I: Construction", Interdisciplinary Information Sciences, Vol. 13 (2007), pp. 255-273.
Non Patent Literature 4: Akiyoshi Kitaoka, "Illusion Introduction", Asakura Publishing Co., Ltd., 2010
Non Patent Literature 5: Hajime Ouchi, Japanese Optical and Geometrical Art, Dover Publ. Inc., New York, (1973)
Non Patent Literature 6: B. Pinna and G. J. Brelstaff, "A new visual illusion of relative motion", Vision Research 40 (2000), pp. 2091-2096.
Non Patent Literature 7: R. Gurnsey and G. Page (having an acute accent on the "e"), "Effects of local and global factors in the Pinna illusion", Vision Research 46 (2006), pp. 1823-1837.

SUMMARY

Technical Problem

However, conventionally, illusion figures are discovered by accident or found and generated in a highly skilled manner by using specific patterns by illusion researchers, designers, or the like, which is a problem in that there is no method of automatically generating an illusion image from an arbitrary image. In particular, although a pinwheel framelet, a simple pinwheel framelet, and a pinwheel wavelet frame are used, for example, for analyzing what causes the creation of an illusion in an illusion figure, they are not used for generating an illusion image from an arbitrary image.

The present invention is achieved in view of the above problems and an object of the present invention is to provide an illusion image generating apparatus, a medium, image data, an illusion image generating method, a printing medium manufacturing method, and a program capable of generating an illusion image from an arbitrary image.

Solution to Problem

It is an object of the present invention to at least partially solve the problems in the conventional technology. According to an aspect of the present invention, an illusion image generating apparatus includes at least a storing unit and a control unit, wherein the storing unit includes a filter storing unit that stores a wavelet frame with orientation selectivity or a filterbank with orientation selectivity that is a set of an approximate filter with no orientation and a plurality of detail filters with respective orientations, and an image data storing unit that stores image data, the control unit includes a decomposing unit that obtains subband signals by performing a multi-resolution decomposition by the wavelet frame with orientation selectivity or the filterbank with orientation selectivity on the image data, and a reconstructing unit that obtains reconstructed image data by reconstructing an image by summing the subband signals obtained by the decomposing unit, and the reconstructing unit generates the reconstructed image data that creates a floating illusion by attenuating or amplifying a subband signal corresponding to at least one of detail filters with a predetermined orientation relative to a floating direction, in which an image is desired to be floated due to an illusion, among the detail filters.

According to another aspect of the present invention, in the illusion image generating apparatus, the reconstructing unit attenuates a subband signal corresponding to at least one of detail filters with an orientation orthogonal or oblique to the floating direction, among the detail filters.

According to still another aspect of the present invention, in the illusion image generating apparatus, the reconstructing unit attenuates a subband signal corresponding to at least one of detail filters belonging to one group among two groups of a group composed of detail filters with an orientation that is neither horizontal nor vertical to an orthogonal axis of the floating direction and is at a negative angle relative to the orthogonal axis and a group composed of detail filters with an orientation that is neither horizontal nor vertical to the orthogonal axis of the floating direction and is at a positive angle relative to the orthogonal axis, and detail filters with an orientation orthogonal to the floating direction, among the detail filters.

According to still another aspect of the present invention, in the illusion image generating apparatus, the reconstructing unit attenuates a subband signal corresponding to at least one of detail filters with an orientation that is tilted such that an absolute value of an angle relative to the orthogonal axis is equal to or greater than 0° and less than or equal to 45°, among the detail filters belonging to the one group and the detail filters with the orientation orthogonal to the floating direction.

According to still another aspect of the present invention, in the illusion image generating apparatus, the reconstructing unit attenuates a subband signal corresponding to at least one of detail filters of up to a higher degree as the angle approaches 0° and up to a lower degree as the angle approaches 45° among the detail filters with the orientation that is tilted such that an absolute value of an angle relative to the orthogonal axis is equal to or greater than 0° and less than or equal to 45°.

According to still another aspect of the present invention, in the illusion image generating apparatus, the reconstructing unit amplifies a subband signal corresponding to at least one of detail filters belonging to another group among two groups of a group composed of detail filters with an orientation that is neither horizontal nor vertical to an orthogonal axis of the floating direction and is at a negative angle relative to the orthogonal axis and a group composed of detail filters with an orientation that is neither horizontal nor vertical to the orthogonal axis of the floating direction and is at a positive angle relative to the orthogonal axis, among the detail filters.

According to still another aspect of the present invention, in the illusion image generating apparatus, the reconstructing unit amplifies a subband signal corresponding to at least one of detail filters that belongs to the another group and has an orientation that is tilted such that an absolute value of an angle relative to the orthogonal axis is 45°.

According to still another aspect of the present invention, in the illusion image generating apparatus, the reconstructing unit attenuates or amplifies a subband signal such that images have floating directions different from each other, which include floating directions opposite to each other, in image regions adjacent to each other in the reconstructed image data.

According to still another aspect of the present invention, in the illusion image generating apparatus, the multiresolution decomposition by the decomposing unit is a maximal overlap multiresolution decomposition, a maximally decimated multiresolution decomposition, or a partially decimated and partially overlap multiresolution decomposition.

According to still another aspect of the present invention, a medium displays an illusion image, wherein the illusion image is such that a predetermined component is attenuated or amplified among components extracted by filters with respective orientations or components with respective orientations, which include wavelet components with respective orientations, the components composing an original image.

According to still another aspect of the present invention, it relates to an image data for displaying an illusion image, wherein the illusion image is such that a predetermined component is attenuated or amplified among components extracted by filters with respective orientations or components with respective orientations, which include wavelet components with respective orientations, the components composing an original image.

According to still another aspect of the present invention, it relates to an illusion image generating method performed by an illusion image generating apparatus that includes at least a storing unit and a control unit, wherein the storing unit includes a filter storing unit that stores a wavelet frame with orientation selectivity or a filterbank with orientation selectivity that is a set of an approximate filter with no orientation and a plurality of detail filters with respective orientations, and an image data storing unit that stores image data, the method includes decomposing step of obtaining subband signals by performing a multiresolution decomposition by the wavelet frame with orientation selectivity or the filterbank with orientation selectivity on the image data, and reconstructing step of obtaining reconstructed image data by reconstructing an image by summing the subband signals obtained in the decomposing unit, the decomposing step and the reconstructing step are performed by the control unit, and the reconstructing step includes generating the reconstructed image data that creates a floating illusion by attenuating or amplifying a subband signal corresponding to at least one of detail filters with a predetermined orientation relative to a floating direction, in which an image is desired to be floated due to an illusion, among the detail filters.

According to still another aspect of the present invention, it relates to a printing medium manufacturing method performed by an illusion image generating apparatus that includes at least a storing unit, a control unit, and a printing unit, wherein the storing unit includes a filter storing unit that stores a wavelet frame with orientation selectivity or a filterbank with orientation selectivity that is a set of an approximate filter with no orientation and a plurality of detail filters with respective orientations, and an image data storing unit that stores image data, the method includes decomposing step of obtaining subband signals by performing a multiresolution decomposition by the wavelet frame with orientation selectivity or the filterbank with orientation selectivity on the image data, reconstructing step of obtaining reconstructed image data by reconstructing an image by summing the subband signals obtained in the decomposing unit, and illusion image outputting step of manufacturing a printing medium by outputting the reconstructed image data obtained in the reconstructing step to the printing unit, the decomposing step, the reconstructing step, and the illusion image outputting step are performed by the control unit, and the reconstructing step includes generating the reconstructed image data that creates a floating illusion by attenuating or amplifying a subband signal corresponding to at least one of detail filters with a predetermined orientation relative to a floating direction, in which an image is desired to be floated due to an illusion, among the detail filters.

According to still another aspect of the present invention, it relates to a program that causes an illusion image generating apparatus that includes at least a storing unit and a control unit to execute an illusion image generating method, wherein the storing unit includes a filter storing unit that stores a wavelet frame with orientation selectivity or a filterbank with orientation selectivity that is a set of an approximate filter with no orientation and a plurality of detail filters with respective orientations, and an image data storing unit that stores image data, the program causes the control unit to execute decomposing step of obtaining subband signals by performing a multiresolution decomposition by the wavelet frame with orientation selectivity or the filterbank with orientation selectivity on the image data, and reconstructing step of obtaining reconstructed image data by reconstructing an image by summing the subband signals obtained in the decomposing unit, and the reconstructing step includes generating the reconstructed image data that creates a floating illusion by attenuating or amplifying a subband signal corresponding to at least one of detail filters with a predetermined orientation relative to a floating direction, in which an image is desired to be floated due to an illusion, among the detail filters.

Moreover, the present invention is related to a recording medium, in which the above-described program is recorded.

Advantageous Effects of Invention

According to this invention, the illusion image generating apparatus stores a wavelet frame with orientation selectivity or a filterbank with orientation selectivity that is a set of an approximate filter with no orientation and a plurality of detail filters with respective orientations, and image data; obtains subband signals by performing a multiresolution decomposition by the wavelet frame with orientation selectivity or the filterbank with orientation selectivity on the image data, and; generates, when reconstructed image data is obtained by reconstructing an image by summing the obtained subband signals, the reconstructed image data that creates a floating illusion by attenuating or amplifying a subband signal corresponding to at least one of detail filters with a predetermined orientation relative to a floating direction, in which an image is desired to be floated due to an illusion, among the detail filters. Therefore, an illusion image can be generated from an arbitrary image. More specifically, the present invention can create an illusion while maintaining representation of the original image by effectively using the distribution of unique orientations that each original image has. Thus, the present invention can have various uses, i.e., the present invention can be applied to various original images.

Moreover, according to the present invention, the illusion image generating apparatus attenuates a subband signal corresponding to at least one of detail filters with an orientation orthogonal or oblique to the floating direction, among the detail filters. Therefore, an illusion image can be generated while maintaining representation of an arbitrary original image.

Moreover, according to the present invention, the illusion image generating apparatus attenuates a subband signal corresponding to at least one of detail filters with an orientation belonging to one group among two groups of a group composed of detail filters with an orientation that is neither horizontal nor vertical to an orthogonal axis of the floating direction and is at a negative angle relative to the orthogonal axis and a group composed of detail filters with an orientation that is neither horizontal nor vertical to the orthogonal axis of the floating direction and is at a positive angle relative to the orthogonal axis, and detail filters with an orientation orthogonal to the floating direction, among the detail filters. Therefore, reconstructed image data in which a floating illusion is enhanced can be generated.

Moreover, according to the present invention, the illusion image generating apparatus attenuates a subband signal corresponding to at least one of detail filters with an orientation that is tilted such that an absolute value of an angle relative to the orthogonal axis of the floating direction is equal to or greater than 0° and less than or equal to 45°, among the detail filters belonging to the one group and the detail filters with the orientation orthogonal to the floating direction. Therefore, floating-illusion reconstructed image data can be generated while further maintaining representation of an arbitrary original image.

Moreover, according to the present invention, the illusion image generating apparatus attenuates a subband signal corresponding to at least one of detail filters of up to a higher degree as the angle approaches 0° and up to a lower degree as the angle approaches 45° among the detail filters with the orientation that is tilted such that an absolute value of an angle relative to the orthogonal axis of the floating direction is equal to or greater than 0° and less than or equal to 45°. Therefore, floating-illusion reconstructed image data can be generated while further maintaining representation of an arbitrary original image.

Moreover, according to the present invention, the illusion image generating apparatus amplifies a subband signal corresponding to at least one of detail filters belonging to another group among two groups of a group composed of detail filters with an orientation that is neither horizontal nor vertical to an orthogonal axis of the floating direction and is at a negative angle relative to the orthogonal axis and a group composed of detail filters with an orientation that is neither horizontal nor vertical to the orthogonal axis of the floating direction and is at a positive angle relative to the orthogonal axis, among the detail filters. Therefore, reconstructed image data in which a floating illusion is enhanced can be generated.

Moreover, according to the present invention, the illusion image generating apparatus amplifies a subband signal corresponding to at least one of detail filters that belongs to another group other than the one group among the two groups and has an orientation that is tilted such that an absolute value of an angle relative to the orthogonal axis of the floating direction is 45°. Therefore, reconstructed image data in which a floating illusion is enhanced can be generated.

Moreover, according to the present invention, the illusion image generating apparatus attenuates or amplifies a subband signal such that images have floating directions different from each other, such as floating directions opposite to each other, in image regions adjacent to each other in the reconstructed image data. Therefore, image regions that have floating directions different from each other, such as floating directions opposite to each other, are adjacent to each other. Thus, reconstructed image data in which a floating illusion is further enhanced can be generated compared with the case where a subband signal corresponding to a detail filter with the same orientation is attenuated or amplified for all the image regions.

Moreover, according to the present invention, the multiresolution decomposition by the decomposing unit is a maximal overlap multiresolution decomposition, a maximally decimated multiresolution decomposition, or a partially decimated and partially overlap multiresolution decomposition. Therefore, a subband signal can be obtained by performing a preferable multiresolution decomposition.

Moreover, according to the present invention, in the medium that displays an illusion image or the image data for displaying an illusion image, the illusion image is such that a predetermined component is attenuated or amplified among components extracted by filters with respective orientations or components with respective orientations, such as wavelet components with respective orientations, which compose an original image. Therefore, it is possible to provide an illusion image generated from an arbitrary original image.

Moreover, according to the present invention, in the printing medium manufacturing method, a wavelet frame with orientation selectivity or a filterbank with orientation selectivity that is a set of an approximate filter with no orientation and a plurality of detail filters with respective orientations and image data are stored. The printing medium manufacturing method includes obtaining subband signals by performing a multiresolution decomposition by the wavelet frame with orientation selectivity or the filterbank with orientation selectivity on the image data; generating, when reconstructed image data is obtained by reconstructing an image by summing the obtained subband signals, the reconstructed image data that creates a floating illusion by attenuating or amplifying a subband signal corresponding to at least one of detail filters with a predetermined orientation relative to a floating direction, in which an image is desired to be floated due to an illusion, among the detail filters; and manufacturing a printing medium by outputting the reconstructed image data to a printing unit. Therefore, a medium on which an illusion image generated from an arbitrary image is printed can be manufactured. More specifically, the present invention can manufacture a printing medium on which an illusion is created while maintaining representation of the original image by effectively using the distribution of unique orientations that each original image has. Thus, the present invention can have various uses, i.e., the present invention can manufacture a printing medium on which an illusion image applied to various original images is printed.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 5 is a diagram in which the approximate part is represented by $a_k$ and the detail parts are represented by symbols (numbers) of $d_k(1)$ to $d_k(99)$ in the pinwheel framelet at level k of degree 7.

FIG. 6 is a diagram representing coefficients applied in association with the array of filters in FIG. 5.

FIG. 7 is a flowchart illustrating one example of the basic processing performed by an illusion image generating apparatus 100 in the present embodiment.

FIG. 10 is a diagram illustrating the original image of a grayscale character string.

FIG. 11 is a diagram illustrating the processing table used in the processing method I-1.

FIG. 26 is a diagram illustrating the processing table used in a processing method V-1-1 for generating an illusion image in which image regions waver laterally in opposite directions to each other when being moved longitudinally.

FIG. 27 is a diagram illustrating the processing table used in a processing method V-1-2 for generating an illusion image in which image regions waver laterally in opposite directions to each other when being moved longitudinally.

FIG. 28 is a diagram illustrating the processing table used in a processing method V-2-1 for generating an illusion image in which image regions waver longitudinally in opposite directions to each other when being moved laterally.

FIG. 29 is a diagram illustrating the processing table used in a processing method V-2-2 for generating an illusion image in which image regions waver longitudinally in opposite directions to each other when being moved laterally.

FIG. 30 is a diagram illustrating the processing table used in a processing method V-3-1 for generating an illusion image in which image regions waver laterally in opposite directions to each other when being moved longitudinally.

FIG. 31 is a diagram illustrating the processing table used in a processing method V-3-2 for generating an illusion image in which image regions waver laterally in opposite directions to each other when being moved longitudinally.

FIG. 32 is a diagram illustrating the processing table used in a processing method V-4-1 for generating an illusion image in which image regions waver longitudinally in opposite directions to each other when being moved laterally.

FIG. 33 is a diagram illustrating the processing table used in a processing method V-4-2 for generating an illusion image in which image regions waver longitudinally in opposite directions to each other when being moved laterally.

FIG. 34 is a diagram illustrating the processing table used in a processing method V-5-1 for generating a floating illusion image that wavers laterally when being moved longitudinally and wavers longitudinally when being moved laterally.

FIG. 35 is a diagram illustrating the processing table used in a processing method V-5-2 for generating a floating illusion image that wavers laterally when being moved longitudinally and wavers longitudinally when being moved laterally.

FIG. 45 is a diagram illustrating the processing table used in a processing method VI-1 for generating an image that creates, when being moved in an oblique direction, illusions of wavering in oblique directions that are orthogonal to the above oblique direction and opposite to each other.

FIG. 46 is a diagram illustrating the processing table used in a processing method VI-2 for generating an image that creates, when being moved in an oblique direction, illusions of wavering in oblique directions that are orthogonal to the above oblique direction and opposite to each other.

DESCRIPTION OF EMBODIMENTS

Figure 1:
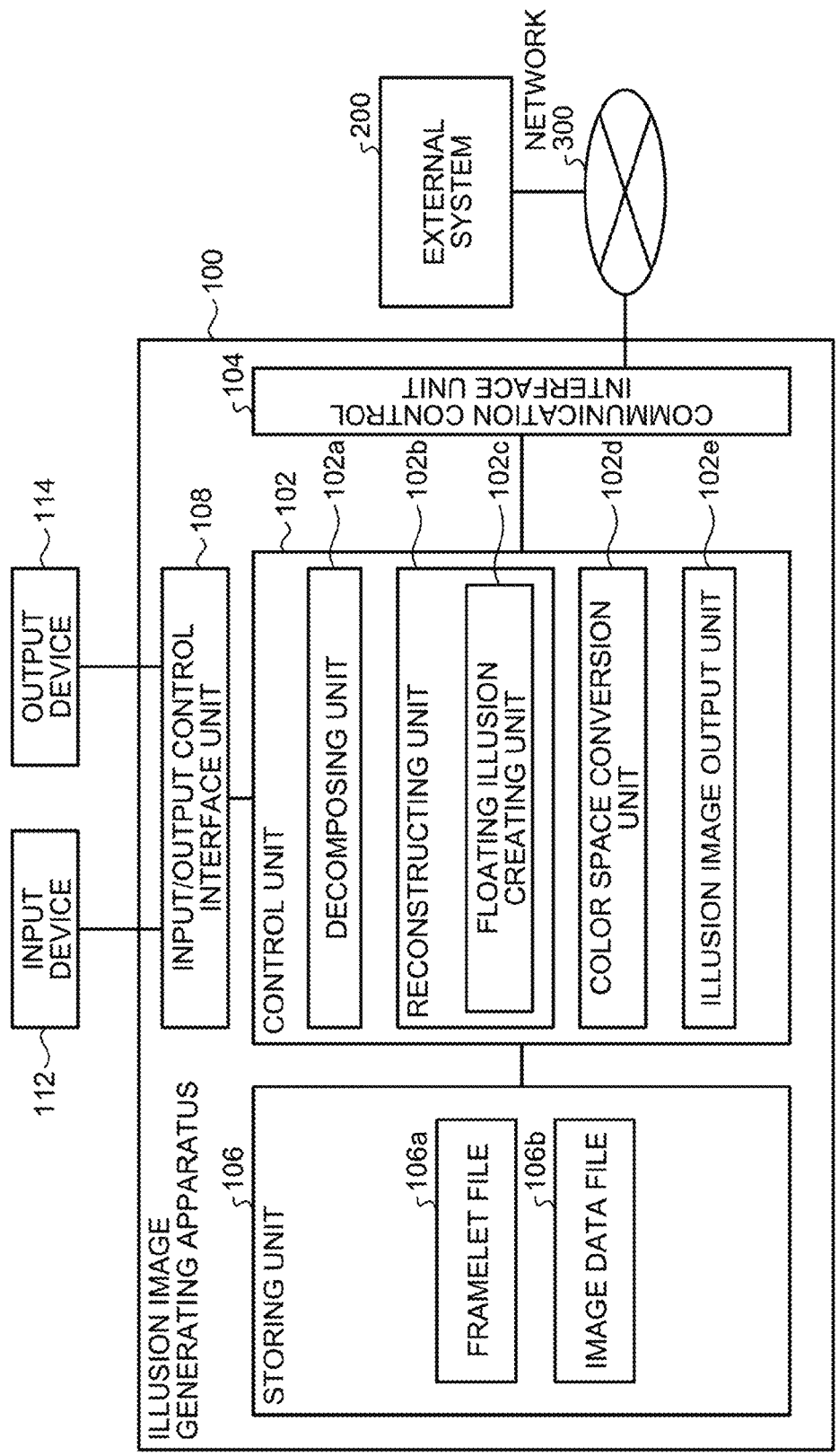
FIG. 1 is a block diagram illustrating an example of the configuration of an illusion image generating apparatus to which the present embodiment is applied.

Embodiments of an illusion image generating apparatus, a medium, image data, an illusion image generating method, a printing medium manufacturing method, and a program according to the present invention will be described in detail below with reference to the drawings. This invention is not limited to the embodiments.

[Illusion Image]

An illusion image according to the medium and the image data in the present embodiment will be described below. Specifically, the medium in the present embodiment is a medium that displays an illusion image and is a medium that permanently displays an illusion image, such as a printing medium (paper, an OHP sheet, or the like) on which an illusion image is printed. The image data in the present embodiment is image data for displaying an illusion image and is, for example, two-dimensional image data in a raster format or a vector format.

The illusion image according to the medium and the image data in the present embodiment has the following characteristics. Specifically, the illusion image is characterized in that a predetermined component among the components that make up the original image and that are extracted by filters with respective orientations is attenuated or amplified. Alternatively, the illusion image is characterized in that a predetermined component among the components with respective orientations, such as wavelet components with respective orientations, that make up the original image is attenuated or amplified.

As an example, such an illusion image is an illusion image that creates an illusion of floating due to the movement of the image or the viewer and is formed as a design, a photograph, and/or a character by having a region formed by the light and dark (brightness), tone, or shades of colors in the image. In other words, the illusion image appears to move differently from the actual movement accompanied by the movement of the viewer or the movement of the image. The original image may be any image representing, for example, a design, a photograph, or a character.

In the present embodiment, the "wavelet" is not limited to a classical wavelet, a wavelet in a narrow sense, and the like and includes a wavelet in a broad sense. For example, the wavelet is a finite-length waveform or a wave-like oscillation with an amplitude that amplifies from zero and quickly converges to zero, and, for example, includes pseudo wavelets, such as a Gabor filter and a curvelet.

Moreover, the "filters with respective orientations" are, for example, a plurality of detail filters with respective orientations. Components, such as subband signals for example, are extracted by the filters.

A component of a predetermined orientation that is attenuated may be, for example, at least one of the components of an orientation that is orthogonal or oblique to the floating direction. A component of a predetermined orientation that is attenuated is not limited to this and may be at least one of the components of orientations that belong to one of two groups, i.e., a group of orientations that are neither horizontal nor vertical to the orthogonal axis of the floating direction and are at a negative angle relative to the orthogonal axis and a group of orientations that are neither horizontal nor vertical to the orthogonal axis of the floating direction and are at a positive angle relative to the orthogonal axis, and the components of an orientation orthogonal to the floating direction, among a plurality of orientations. More specifically, a component of a predetermined orientation that is attenuated may be at least one of the components of orientations that are tilted such that the absolute value of the angle relative to the orthogonal axis is equal to or greater than 0° and less than or equal to 45°, among the orientations belonging to one group and the orientation orthogonal to the floating direction. Still more specifically, a component of a predetermined orientation that is attenuated may be at least one of the components of orientations that include those up to a higher degree as the angle approaches 0° and those up to a lower degree as the angle approaches 45° among the orientations that are tilted such that the absolute value of the angle relative to the orthogonal axis is equal to or greater than 0° and less than or equal to 45°.

Conversely, a component of a predetermined orientation that is amplified may be at least one of the components of orientations that belong to the other of the two groups, i.e., the group of orientations that are neither horizontal nor vertical to the orthogonal axis of the floating direction and are at a negative angle relative to the orthogonal axis and the group of orientations that are neither horizontal nor vertical to the orthogonal axis of the floating direction and are at a positive angle relative to the orthogonal axis, among a plurality of orientations. More specifically, a component of a predetermined orientation that is amplified may be at least one of the components of orientations that belong to the other group and are tilted such that the absolute value of the angle relative to the orthogonal axis is 45°.

In the illusion image, a component of a predetermined orientation may be attenuated or amplified such that image regions adjacent to each other have floating directions different from each other, such as floating directions opposite to each other. Consequently, the floating illusion is enhanced.

This is the end of the explanation of the illusion image according to the medium and the image data in the present embodiment. The illusion image according to the medium and the image data may be generated by an illusion image generating apparatus, an illusion image generating method, a printing medium manufacturing method, or the like described in the following embodiment.

[Configuration of Illusion Image Generating Apparatus]

Next, the configuration of the illusion image generating apparatus will be described with reference to FIG. 1. FIG. 1 is a block diagram illustrating an example of the configuration of the illusion image generating apparatus to which the present embodiment is applied and schematically illustrates only a portion relating to the present embodiment in the configuration.

In FIG. 1, an illusion image generating apparatus 100 schematically includes a control unit 102, a communication control interface unit 104, an input/output control interface unit 108, and a storing unit 106. The control unit 102 is a CPU or the like that performs overall control of the illusion image generating apparatus 100. The input/output control interface unit 108 is an interface connected to an input device 112 and an output device 114. Moreover, the storing unit 106 is a device that stores various databases, tables, and the like.

These units of the illusion image generating apparatus 100 are communicatively connected via an arbitrary communication channel.

Various files (a framelet file 106a and an image data file 106b) stored in the storing unit 106 are storage units, such as a fixed disk drive. For example, the storing unit 106 stores various programs, tables, files, databases, web pages, and the like used for various processings.

Figure 2:
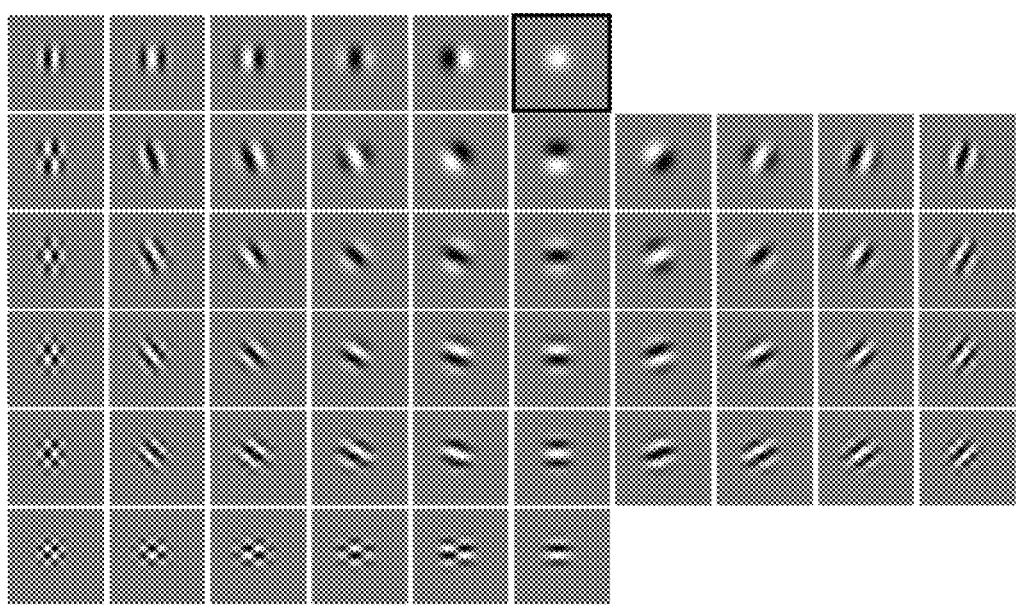
FIG. 2 is a diagram illustrating an example of filters that are obtained by calculating the cyclic correlation product of maximal overlap pinwheel framelet filters at level 3 of degree 5 and maximal overlap pinwheel framelet approximate filters at level 1 and level 2 of degree 5 and that are for actually obtaining decomposition in the decomposition phase at level 3 in maximal overlap multiresolution decomposition by the framelets.

Among these components of the storing unit 106, the framelet file 106a is a filter storing unit that stores wavelet frames with orientation selectivity or filterbanks with orientation selectivity, which are each a set of an approximate filter with no orientation and a plurality of detail filters with respective orientations. In the present embodiment, a pinwheel framelet is used as a wavelet frame with orientation selectivity; however, the wavelet frame with orientation selectivity is not limited to this and, for example, a simple pinwheel framelet (see Non Patent Literature 2), a pinwheel wavelet frame (see Non Patent Literature 3), or the like may be used. Whereas a pinwheel wavelet frame is such that the length of the filters composing the frame changes in accordance with the number of pixels of the original image, a pinwheel framelet and a simple pinwheel framelet have a property where the length of the filters is independent of the number of pixels. For example, a pinwheel framelet is a two-dimensional framelet with orientation selectivity and is one type of a multiwavelet frame. A pinwheel framelet is, for example, a mathematical model of simple cells in the human visual cortex. This decomposition is a mathematical model of signals decomposed by simple cells in the human brain. A pinwheel framelet is a model neuroscientifically closer to simple cells in V1 of the cerebral cortex than a simple pinwheel framelet. A pinwheel framelet, for example, has a degree that is an odd number of three or greater. The larger the degree, the more the orientations can be detected. A pinwheel framelet has a property where the number of filters increases and the calculation time increases as the degree increases. Moreover, the number of filters of a pinwheel framelet of degree n is, for example, $(n+1)^2+(n-1)^2$. Among them, one filter is an approximate filter and the remaining filters are detail filters. FIG. 2 illustrates filters obtained by calculating the cyclic correlation product of maximal overlap pinwheel framelet filters at level 3 of degree 5 and maximal overlap pinwheel framelet approximate filters at level 1 and level 2 of degree 5 (for example of the cyclic correlation product, see Hitoshi Arai, "Linear Algebra, Basics and Applications", Nippon hyoron sha Co., Ltd. (2006)).

Because the degree of this pinwheel framelet is 5, for example, as illustrated FIG. 2, the pinwheel framelet is composed of a set of 52 filters in total, i.e., 6×6 filters on the left side and 4×4 filters on the right side, for each level. Among them, one filter surrounded by a black rectangle in the central upper portion in FIG. 2 is a filter obtained by calculating the cyclic correlation product of the approximate filters from level 1 to level 3, and the other 51 filters are filters obtained by calculating the cyclic correlation product of the detail filters at level 3 and the approximate filters from level 1 to level 2. The orientations of the filters generated by the detail filters are arranged substantially in the direction in which a pinwheel rotates around the filter generated only from the approximate filters. As will be described later, maximal overlap multiresolution decomposition by using a pinwheel framelet of each degree has levels, and level 1 detects the finest portion (high frequency portion). FIG. 2 illustrates the pinwheel framelet at level 3, and approximate portions (low frequency portions) are detected as the level increases to 2, 3, . . . . The framelet file 106a may store wavelet frames with orientation selectivity, such as a pinwheel framelet, in the form of a function (such as a frequency response function of framelet filters). A specific example of the function will be described later.

Various wavelets may be used in the present embodiment without being limited to the above. The wavelet is not limited to a classical wavelet, a wavelet in a narrow sense, and the like and includes a wavelet in a broad sense. For example, the wavelet is a finite-length waveform or a wave-like oscillation with an amplitude that amplifies from zero and quickly converges to zero, and, for example, includes pseudo wavelets, such as a Gabor filter and a curvelet. Moreover, the framelet file 106a may store a filter group, such as a filterbank with orientation selectivity, and filters with orientations without being limited to a frame, such as a wavelet frame with orientation selectivity.

The image data file 106b is an image data storing unit that stores image data. The image data stored in the image data file 106b may be, for example, image data input via the input device 112 or may be image data received from an external system 200 or the like via a network 300. Moreover, the image data may be image data for a color image or may be grayscale image data. An image (data) before being subjected to multiresolution decomposition by wavelet frames with orientation selectivity, such as a pinwheel framelet, is referred to as the original image (data) and an image (data) after being reconstructed on the basis of subband signals is referred to as a reconstructed image (data). The image data file 106b may store, as image data, a unit impulse signal for an image size (the number of pixels) that is the same as that of the image data for the target original image. The unit impulse signal stored in the image data file 106b is input to the filterbank stored in the framelet file 106a as image data in a similar manner and the output unit impulse response is used for high-speed calculation of the image data for the target original image. A high-speed calculation method will be described in detail later.

Here the description returns to FIG. 1 again. The input/output control interface unit 108 controls the input device 112 and the output device 114. As the output device 114, a display device, such as a monitor (including a domestic television), a printing device, such as printer, and the like can be used. Moreover, as the input device 112, a keyboard, a mouse, a microphone, or the like can be used in addition to an imaging device, such as a camera, an input device connected to an external storage medium, and the like.

Moreover, in FIG. 1, the control unit 102 includes an internal memory for storing a control program, such as an OS (Operating system), a program defining various processing procedures and the like, and required data. The control unit 102 performs information processing for performing various processings by these programs or the like. The control unit 102 includes a decomposing unit 102a, a reconstructing unit 102b, a color space conversion unit 102d, and an illusion image output unit 102e on the basis of functional concept. The reconstructing unit 102b further includes a floating illusion creating unit 102c.

Figure 3:
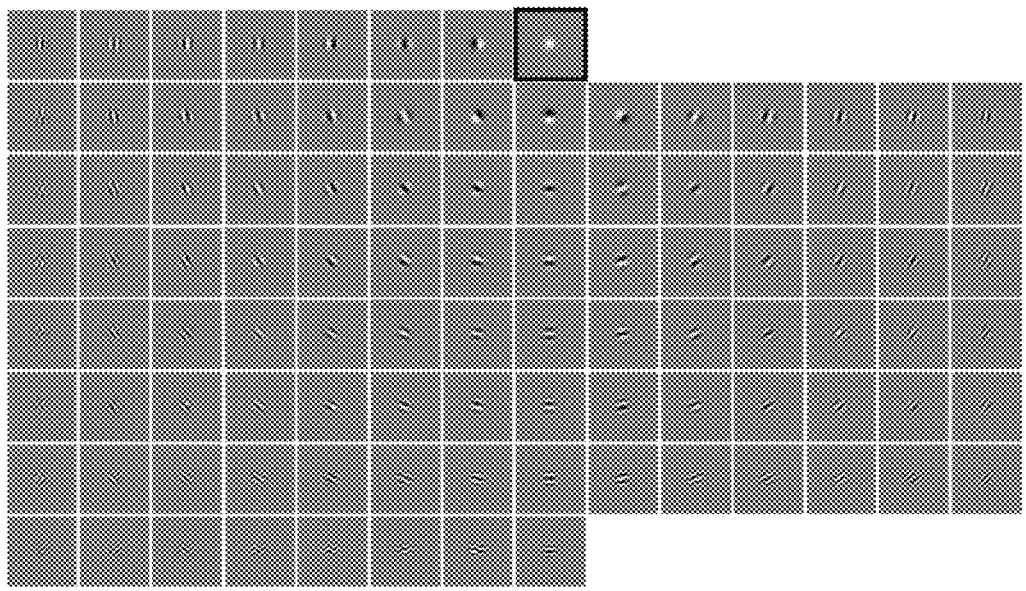
FIG. 3 is a diagram illustrating filters obtained by calculating the cyclic correlation product of maximal overlap pinwheel framelet filters at level 2 (high frequency side) of degree 7 and a maximal overlap pinwheel framelet approximate filter at level 1 of degree 7 and is a diagram for showing the difference depending on the level.
Figure 4:
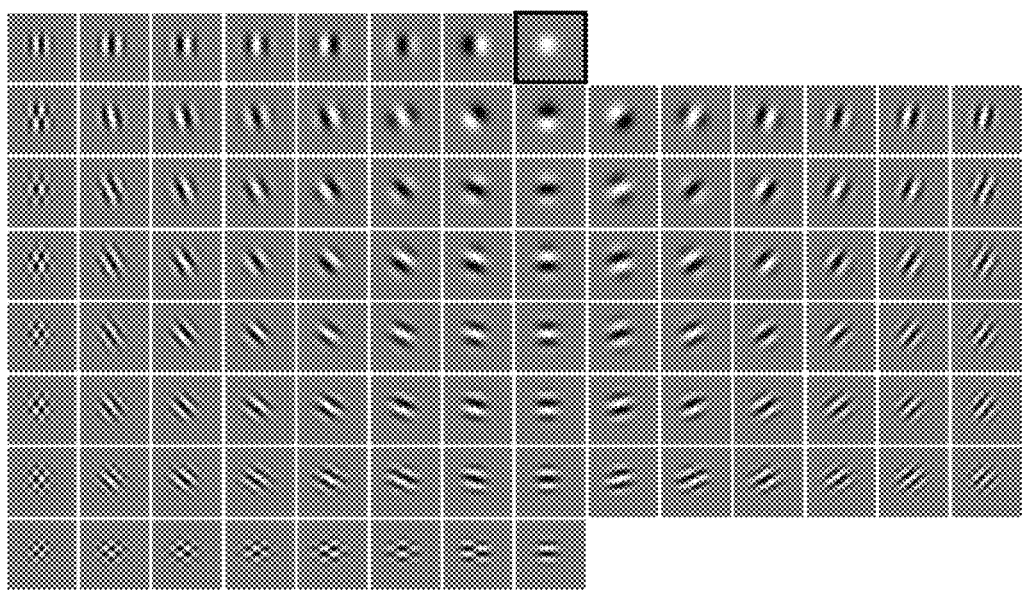
FIG. 4 is a diagram illustrating filters obtained by calculating the cyclic correlation product of maximal overlap pinwheel framelet filters at level 3 (low frequency side) of degree 7 and maximal overlap pinwheel framelet approximate filters at level 1 and level 2 of degree 7 and is a diagram for showing the difference depending on the level.

Among them, the decomposing unit 102a is a decomposing unit that obtains subband signals by performing multiresolution decomposition on image data by using wavelet frames with orientation selectivity, such as a pinwheel framelet, or filterbanks with orientation selectivity stored in the framelet file 106a. The "multiresolution decomposition" includes maximal overlap multiresolution decomposition, maximally decimated multiresolution decomposition, and partially decimated and partially overlap multiresolution decomposition (for example of maximal overlap multiresolution decomposition, see Hitoshi Arai, "Wavelet", Kyoritsu Shuppan Co., Ltd. (2010)). When multiresolution decomposition is calculated by the decomposing unit 102a, the cyclic correlation product and the cyclic convolution product are used; however, it may be calculated by a well-known high-speed calculation method in which a fast Fourier transform is used. As described above, multiresolution decomposition by wavelet frames with orientation selectivity, such as a pinwheel framelet, has levels. FIG. 3 and FIG. 4 are diagrams for showing the difference depending on the level of a pinwheel framelet. FIG. 3 illustrates filters obtained by calculating the cyclic correlation product of maximal overlap pinwheel framelet filters at level 2 (high frequency side) and a maximal overlap pinwheel framelet approximate filter at level 1. FIG. 4 illustrates filters obtained by calculating the cyclic correlation product of maximal overlap framelet filters at level 3 (low frequency side) and maximal overlap pinwheel framelet approximate filters at level 1 and level 2. Because the degree of both of them is 7, the number of filters is $(7+1)^2+(7-1)^2=100$.

As an example, the decomposing unit 102a first detects the finest portion (high frequency portion) by maximal overlap multiresolution decomposition by using a pinwheel framelet at level 1 and detects approximate portions (low frequency portions) as the level increases to 2, 3, . . . .

Multiresolution decomposition by pinwheel framelets includes a decomposition phase and a synthesis phase. Each phase is composed of a filterbank composed of an array of approximate filters and detail filters. After performing the image processing in the decomposition phase and the synthesis phase, the decomposing unit 102a finally decomposes the original image data into image signals (specifically, subband signals) the number of which is "the number of filters×levels".

For example, in the case of maximal overlap multiresolution decomposition of 5 levels by using a pinwheel framelet of degree 7, the subband signals at a certain level k (k=1 to 5) include 1 approximate part obtained by 1 approximate filter and 99 detail parts obtained by 99 detail filters. FIG. 5 is a diagram in which the approximate part is represented by $a_k$ and the detail parts are represented by symbols (numbers) of $d_k(1)$ to $d_k(99)$ in the pinwheel framelet at level k of degree 7. The position of the symbol (number) is associated with the position of each filter in FIG. 3 (k=2) or FIG. 4 (k=3). In other words, $a_k$ and $d_k(1)$ to $d_k(99)$ represent the subband signals obtained by the filters at the corresponding positions in FIG. 3 or FIG. 4.

Moreover, the reconstructing unit 102b is a reconstructing unit that obtains reconstructed image data by reconstructing an image by summing the subband signals obtained by the decomposing unit 102a. For example, the reconstructing unit 102b obtains reconstructed image data by reconstructing an image by summing the subband signal of the approximate part obtained by the approximate filter at the maximum level described above and the subband signals of the detail parts obtained by all the detail filters. At this point, if the pinwheel framelet has a perfect reconstruction property and the floating illusion creating unit 102c to be described later does not perform any processing, the reconstructing unit 102b reproduces an image that is the same as the original image. In other words, the reconstructing unit 102b obtains reconstructed image data that creates a floating illusion (differently from the original image) by summing the subband signals after attenuating (deleting) or amplifying (enhancing) a specific subband signal by the processing performed by the floating illusion creating unit 102c.

The relationship between the perfect reconstruction property and the floating illusion creating processing will be described using the symbols (numbers) described above. The perfect reconstruction property of maximal overlap multi-resolution decomposition is expressed by the following equation:

$$x=a_5+(d_5(1)+\ldots+d_5(99))+\ldots+(d_1(1)+\ldots+d_1(99))$$

where x is the input signal (original signal) of the original image.

A coefficient of an appropriate real number is applied to each detail part thus, $b_{5,1}, \ldots, b_{5,99}, \ldots, b_{1,1}, \ldots, b_{1,99}$. FIG. 6 is a diagram representing coefficients applied in association with the array of filters in FIG. 5. In this case, the reconstructed image (signal) is represented by the following equation:

$$y=a_5+(b_{5,1}d_5(1)+\ldots+b_{5,99}d_5(99))+\ldots+(b_{1,1}d_1(1)+\ldots+b_{1,99}d_1(99))$$

At this point, if each coefficient $b_{5,1}=\ldots=b_{5,99}=\ldots=b_{1,1}=\ldots=b_{1,99}=1$, then obviously x=y (the original image and the reconstructed image are the same), which indicates a perfect reconstruction. In the present embodiment, as an example, the floating illusion creating unit 102c generates the reconstructed image that creates a floating illusion by setting the values $b_{5,1}, \ldots, b_{5,99}, \ldots, b_{1,1}, \ldots, b_{1,99}$ such that a floating illusion can be created.

Before describing a subband signal that is attenuated or amplified so as to create a floating illusion, classification of the detail filters will be described. The detail filters can be classified into five types on the basis of their orientation. Specifically, if the axis orthogonal to the floating direction, in which an image is desired to be floated due to an illusion, is referred to as the "orthogonal axis", the detail filters can be classified into five types, i.e., a (1) detail filter with an orientation in the same direction as the orthogonal axis, a (2) detail filter with an orientation in the direction vertical to the orthogonal axis, a (3) detail filter with an orientation that is at a positive angle relative to the orthogonal axis, a (4) detail filter with an orientation that is at a negative angle relative to the orthogonal axis, and a (5) detail filter whose orientation is not uniquely defined. The angle θ relative to the orthogonal axis of the floating direction is represented by $-90°<θ\leq+90°$, where the counterclockwise direction is defined as the positive direction. The detail filter with an orientation (θ=0°, 90°) horizontal or vertical to the orthogonal axis is classified as (1) or (2) and therefore is not classified as (3) or (4). Moreover, the "(5) detail filter whose orientation is not uniquely defined" includes orientations at both a positive angle and a negative angle, the absolute values of which relative to the orthogonal axis are the same; therefore, this detail filter is not classified as (3) or (4).

If the longitudinal direction is the floating direction, in the example in FIG. 5, the subband signals corresponding to the "(1) detail filter with an orientation in the same direction as the orthogonal axis" are $d_k(15), d_k(23), d_k(31), d_k(39), d_k(47), d_k(55)$, and $d_k(63)$. The subband signals corresponding to the "(2) detail filter with an orientation in the direction vertical to the orthogonal axis" are $d_k(1)$ to $d_k(7)$. The subband signals corresponding to the "(3) detail filter with an orientation that is at a positive angle relative to the orthogonal axis" are $d_k(64)$ to $d_k(99)$. The subband signals corresponding to the "(4) detail filter with an orientation that is at a negative angle relative to the orthogonal axis" are $d_k(9)$ to $d_k(14), d_k(17)$ to $d_k(22), d_k(25)$ to $d_k(30), d_k(33)$ to $d_k(38), d_k(41)$ to $d_k(46)$, and $d_k(49)$ to $d_k(54)$. The subband signals corresponding to the "(5) detail filter whose orientation is not uniquely defined" are $d_k(8), d_k(16), d_k(24), d_k(32), d_k(40), d_k(48)$, and $d_k(56)$ to $d_k(62)$. The above description is the explanation of the classification of the detail filters.

The floating illusion creating unit 102c is a floating illusion creating unit that attenuates or amplifies a subband signal corresponding to a detail filter with a predetermined orientation (a specifically determined orientation) relative to the floating direction in which an image is desired to be floated due to an illusion.

In the present embodiment, as an example, the floating illusion creating unit 102c may generate reconstructed image data that creates a floating illusion by attenuating the subband signal corresponding to the detail filter with an orientation orthogonal to the floating direction in which an image is desired to be floated due to an illusion, among a plurality of the detail filters. Specifically, the floating illusion creating unit 102c may attenuate the subband signals corresponding to the "(1) detail filter with an orientation in the same direction as the orthogonal axis" in the classification described above. For example, in FIG. 5, when an image is desired to be floated in the longitudinal direction (vertical direction in FIG. 5) due to an illusion, the floating illusion creating unit 102c attenuates the subband signals of $d_k(15), d_k(23), d_k(31), d_k(39), d_k(47), d_k(55)$, and $d_k(63)$. More specifically, the floating illusion creating unit 102c sets the coefficients of $b_{k,15}, b_{k,23}, b_{k,31}, b_{k,39}, b_{k,47}, b_{k,55}$, and $b_{k,63}$ to values equal to or greater than zero and less than one (see FIG. 6). In the subband signals generated by the decomposing unit 102a from the original image data, if the bias in the signal strength is low between the subband signals corresponding to the "(3) detail filter with an orientation that is at a positive angle relative to the orthogonal axis" and the subband signals corresponding to the "(4) detail filter with an orientation that is at a negative angle relative to the orthogonal axis", a floating illusion created by the signal attenuation by the floating illusion creating unit 102c using this method is weak in some cases; however, the bias in the signal strength can be amplified and thus the floating illusion can be enhanced by attenuating or amplifying a subband signal by further performing the following method 1 or 2.

(Method 1: Attenuation of a Subband Signal in One Group Among Two Groups)

In the method 1, the subband signal corresponding to at least one of the detail filters belonging to one group is attenuated among two groups, i.e., the group composed of the "(3) detail filters with orientations that are at a positive angle relative to the orthogonal axis" and the group composed of the "(4) detail filters with orientations that are at a negative angle relative to the orthogonal axis". Specifically, among a plurality of the detail filters, the floating illusion creating unit 102c may further attenuate the subband signal corresponding to at least one of the detail filters belonging to one group among the two groups, i.e., the group composed of the detail filters with orientations that are neither horizontal nor vertical to the orthogonal axis of the floating direction and are at a negative angle relative to the orthogonal axis and the group composed of the detail filters with orientations that are neither horizontal nor vertical to the orthogonal axis of the floating direction and are at a positive angle relative to the orthogonal axis. More specifically, if the group composed of the "(4) detail filters with orientations that are at a negative angle relative to the orthogonal axis" is defined as "one group", the floating illusion creating unit 102c sets the coefficient of at least one of $b_{k,9}$ to $b_{k,14}, b_{k,17}$ to $b_{k,22}, b_{k,25}$ to $b_{k,30}, b_{k,33}$ to $b_{k,38}, b_{k,41}$ to $b_{k,46}$, and $b_{k,49}$ to $b_{k,54}$ corresponding to the one group to a value equal to or greater than zero and less than one.

When the range of the subband signals to be attenuated is further limited, it is possible to attenuate the subband signal corresponding to at least one of the detail filters with orientations that are tilted such that the absolute value of the angle relative to the orthogonal axis is greater than 0° and less than or equal to 45°, among the detail filters belonging to one group. More specifically, if the group composed of the "(4) detail filters with orientations that are at a negative angle relative to the orthogonal axis" is "one group", the floating illusion creating unit 102c sets the coefficient of at least one of $b_{k,14}$, $b_{k,21}$, $b_{k,22}$, $b_{k,28}$ to $b_{k,30}$, $b_{k,35}$ to $b_{k,38}$, $b_{k,42}$ to $b_{k,46}$, and $b_{k,49}$ to $b_{k,54}$ to a value equal to or greater than zero and less than one.

When the range of the subband signals to be attenuated is still further limited, it is possible to attenuate the subband signal corresponding to at least one of the detail filters that include those up to a higher degree as the angle approaches 0° and those up to a lower degree as the angle approaches 45°, among the detail filters with orientations that are tilted such that the absolute value of the angle relative to the orthogonal axis is greater than 0° and less than or equal to 45°. More specifically, if the group composed of the "(4) detail filters with orientations that are at a negative angle relative to the orthogonal axis" is "one group", the floating illusion creating unit 102c sets the coefficient of at least one of $b_{k,14}$, $b_{k,21}$, $b_{k,22}$, $b_{k,28}$ to $b_{k,30}$, $b_{k,36}$ to $b_{k,38}$, $b_{k,45}$, $b_{k,46}$, and $b_{k,54}$ to a value equal to or greater than zero and less than one. As described above, if the subband signal corresponding to at least one of the detail filters belonging to one group is attenuated, some of the subband signals corresponding to the detail filters with an orientation orthogonal to the floating direction may not be attenuated.

(Method 2: Amplification of a Subband Signal in the Other of Two Groups)

In the method 2, the subband signal corresponding to at least one of the detail filters belonging to the other group (the group that is different from the one group in the method 1) is amplified among two groups, i.e., the group composed of the "(3) detail filters with orientations that are at a positive angle relative to the orthogonal axis" and the group composed of the "(4) detail filters with orientations that are at a negative angle relative to the orthogonal axis". For example, the floating illusion creating unit 102c amplifies the subband signal corresponding to the detail filter that belongs to the other group among the two groups and has an orientation of 45° relative to the orthogonal axis of the floating direction. More specifically, if the group composed of the "(3) detail filters with orientations that are at a positive angle relative to the orthogonal axis" is "the other group", the floating illusion creating unit 102c sets the coefficients of $b_{k,64}$, $b_{k,71}$, $b_{k,78}$, $b_{k,85}$, $b_{k,92}$, and $b_{k,99}$ to a value greater than one to amplify the subband signals corresponding to the detail filters of $d_k(64)$, $d_k(71)$, $d_k(78)$, $d_k(85)$, $d_k(92)$, and $d_k(99)$.

The above description is an example of a pattern of the subband signals attenuated or amplified by the floating illusion creating unit 102c. In the example of the symbols (numbers) and the coefficients with reference to FIG. 5 described above, an explanation is given of the example where the longitudinal direction is the floating direction; however, if an image is desired to be floated in the lateral direction, it is sufficient to attenuate or amplify the subband signals of the detail filters of a pattern obtained by flipping the above pattern about a 45° axis in a similar manner (example will be described later). Moreover, in the above example, an explanation is given of the example where the group composed of the "(4) detail filters with orientations that are at a negative angle relative to the orthogonal axis" is "one group" and the group composed of the "(3) detail filters with orientations that are at a positive angle relative to the orthogonal axis" is "the other group"; however, it is possible to attenuate or amplify the subband signals of the detail filters of a pattern obtained by inverting the right and left parts of the above pattern by interchanging both groups in a similar manner. In this case, the floating direction is reversed along the same axis. This can be used to enhance the floating illusion such that images float in opposite directions to each other in two adjacent image regions.

In other words, the floating illusion creating unit 102c may control the orientations of the detail filters that attenuate or amplify subband signals such that the floating directions are opposite to each other in the image regions adjacent to each other in the reconstructed image data. In other words, because there are detail filters in which the absolute value of the angle is the same between the "(3) detail filters with orientations that are at a positive angle relative to the orthogonal axis" and the "(4) detail filters with orientations that are at a negative angle relative to the orthogonal axis", it is sufficient to interchange positive and negative signs of the angle of the orientations of the detail filters for the targets to be attenuated or amplified between two adjacent image regions. For example, in one image region, when the subband signals of $d_k(64)$, $d_k(71)$, $d_k(78)$, $d_k(85)$, $d_k(92)$, and $d_k(99)$ are amplified as in the above example, the floating illusion creating unit 102c amplifies the subband signals corresponding to the detail filters of $d_k(14)$, $d_k(21)$, $d_k(28)$, $d_k(35)$, $d_k(42)$, and $d_k(49)$ in the other image region adjacent to the one image region. The floating illusion creating unit 102c may divide the original image data into two or more image regions and then amplify or attenuate the corresponding subband signals in each image region. Moreover, the floating illusion creating unit 102c may amplify or attenuate the corresponding subband signals in the data of the same or different two or more original images and then combine the images.

Here the description returns to FIG. 1 again. The color space conversion unit 102d is a color space conversion unit that performs conversion of the color space, decomposition and synthesis of the color components, and the like. For example, when the image data stored in the image data file 106b is a color image, the color space conversion unit 102d converts the color space to the CIELAB color space before processing is performed by the decomposing unit 102a. Consequently, the image is decomposed into three color components, i.e., L* (brightness), a* (red-green), and b* (yellow-blue). The color space conversion unit 102d may convert the color space to other color spaces other than the CIELAB color space. The advantage of using the CIELAB color space is that only brightness information can be used as an input signal for the decomposing unit 102a. When the image data is grayscale, the color space conversion unit 102d does not need to perform processing relating to the color space.

Moreover, the illusion image output unit 102e outputs, to the output device 114, reconstructed image data reconstructed by the reconstructing unit 102b while attenuating or amplifying subband signals by the floating illusion creating unit 102c after causing the color space conversion unit 102d to perform synthesis of the color components, conversion of the color space, scale conversion of the brightness and color, and the like if necessary. For example, the illusion image output unit 102e may display and output a reconstructed image to a display device, such as a monitor, or print output a reconstructed image to a printing device, such as a printer, and create a printing medium. The medium that is a printing target may be, for example, paper, an OHP sheet, or the like, or may be in the form of, for example, a flyer, a fan, a card, a picture book, a New Year's card, a Christmas card, a business card, or the like. The illusion image output unit 102e may change the design (for example, the size is changed to postcard size or the like) depending on its intended use according to the output form. Moreover, the illusion image output unit 102e may transmit a reconstructed image data to the external system 200 via the network 300.

In other words, the illusion image generating apparatus 100 may be communicatively connected to the network 300 via a communication device, such as a router, and a wired or wireless communication line, such as a dedicated line. In FIG. 1, the communication control interface unit 104 performs communication control between the illusion image generating apparatus 100 and the network 300 (or a communication device, such as a router). In other words, the communication control interface unit 104 is an interface connected to a communication device (not shown), such as a router, connected to a communication line or the like, and has a function of performing data communication with other terminals via communication lines. In FIG. 1, the network 300 has a function of mutually connecting the illusion image generating apparatus 100 and the external system 200 and is, for example, the Internet or the like.

In FIG. 1, the external system 200 is mutually connected to the illusion image generating apparatus 100 via the network 300 and may have a function of providing a program for causing an external database relating to image data or a pinwheel framelet or a computer to function as the illusion image generating apparatus. The external system 200 may be configured as a WEB server, an ASP server, or the like. Moreover, the hardware configuration of the external system 200 may be composed of an information processing apparatus, such as commercially available workstation and personal computer, and accessory devices thereof. The functions of the external system 200 are realized by a CPU, a disk device, a memory device, an input device, an output device, a communication control device, and the like in the hardware configuration of the external system 200, programs for controlling these devices, and the like.

This is the end of the explanation of the configuration of the illusion image generating apparatus 100 according to the present embodiment.

[Processing by Illusion Image Generating Apparatus 100]

Next, one example of the processing performed by the illusion image generating apparatus 100 according to the present embodiment configured as above will be described in detail below with reference to FIG. 7 to FIG. 53.

[Basic Processing]

First, the basic processing performed by the illusion image generating apparatus 100 will be described with reference to FIG. 7 and FIG. 8. FIG. 7 is a flowchart illustrating one example of the basic processing performed by the illusion image generating apparatus 100 in the present embodiment.

First, the decomposing unit 102a obtains subband signals by performing maximal overlap multiresolution decomposition by using the pinwheel framelets stored in the framelet file 106a on the image data stored in the image data file 106b (Step SA-1). FIG. 8 is a diagram illustrating one example of the filterbanks in the decomposition phase and the synthesis phase of maximal overlap multiresolution decomposition. The numbers in FIG. 8 indicate levels. "PW" indicates a detail filter. In the case of degree 7, 99 detail filters are present for each level. "A" indicates an approximate filter. In the case of degree 7, one approximate filter is present for each level.

Figure 8:
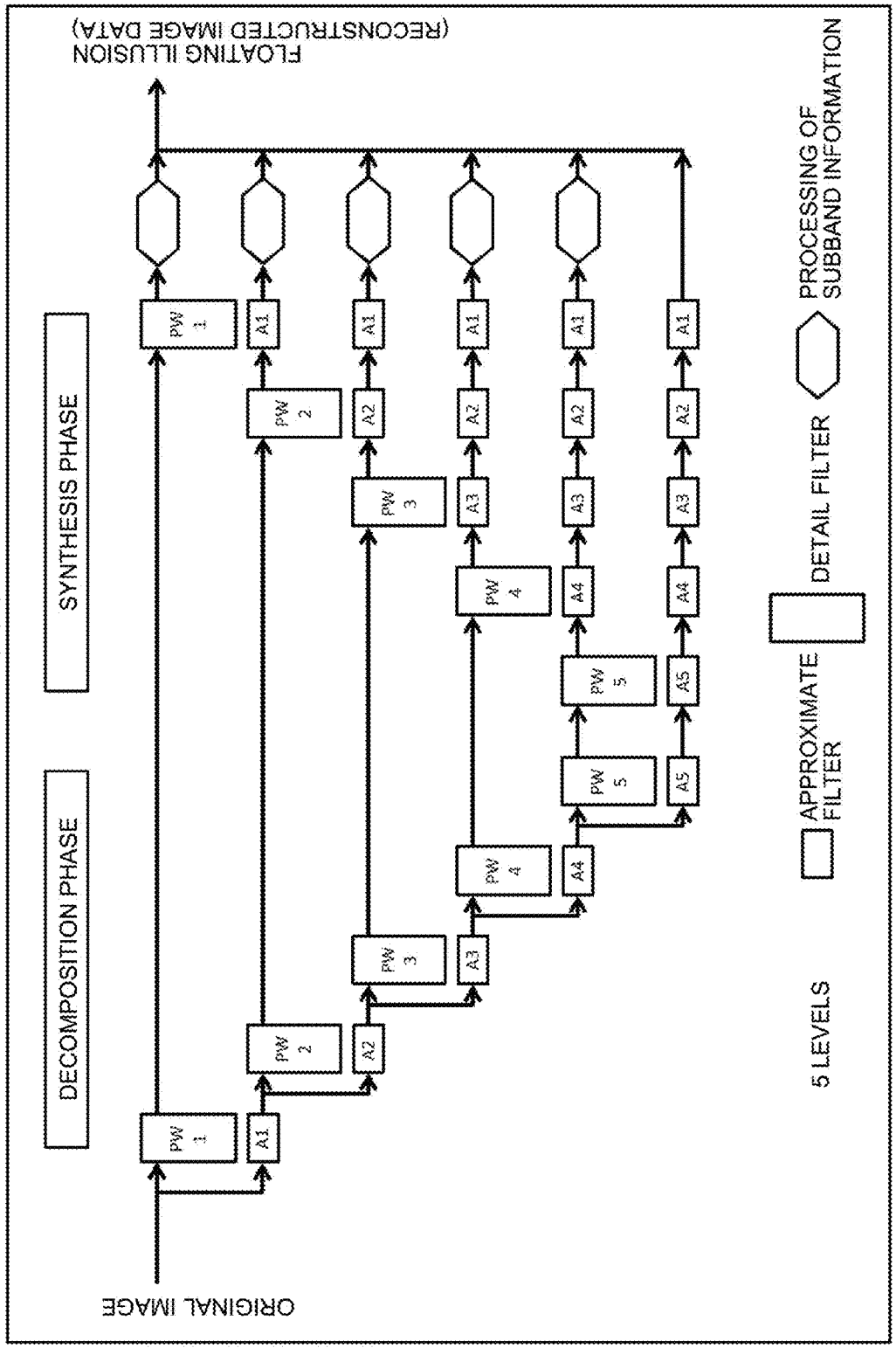
FIG. 8 is a diagram illustrating one example of the filterbanks in the decomposition phase and the synthesis phase of maximal overlap multiresolution decomposition.

As illustrated in FIG. 8, first, the decomposing unit 102a decomposes the original image as an input signal into signals that pass 99 detail filters and a signal that passes 1 approximate filter by using the pinwheel framelet at level 1. Next, the decomposing unit 102a decomposes the signal that has passed the approximate filter at level 1 into signals that pass 99 detail filters (at level 2) and a signal that passes 1 approximate filter (at level 2) by using the pinwheel framelet at level 2. The decomposing unit 102a repeats this processing until the level reaches the maximum level (in the case of FIG. 8, at level 5). Then, the decomposing unit 102a puts the signals obtained in the decomposition phase through the filterbank in the synthesis phase and finally obtains 99×5 subband signals (detail parts) and 1 subband signal (approximate part).

Here the description returns to FIG. 7 again. The reconstructing unit 102b does not perfectly reconstruct the image by simply summing the subband signals obtained by the decomposing unit 102a in the above manner but creates a floating illusion on the reconstructed image data by attenuating or amplifying subband signals from detail filters of a specific pattern by the processing performed by the floating illusion creating unit 102c (Step SA-2). In the present embodiment, as illustrated in FIG. 8, the floating illusion creating unit 102c performs processing on the subband information by multiplying the subband signals output from the decomposing unit 102a by coefficients. A specific example of a pattern of detail filters that attenuate or amplify subband signals will be described in detail in the next section.

Then, the reconstructing unit 102b reconstructs the image by summing the subband signals processed by the floating illusion creating unit 102c as above (Step SA-3).

Then, the basic processing performed by the illusion image generating apparatus 100 ends.

[Specific Processing]

Figure 9:
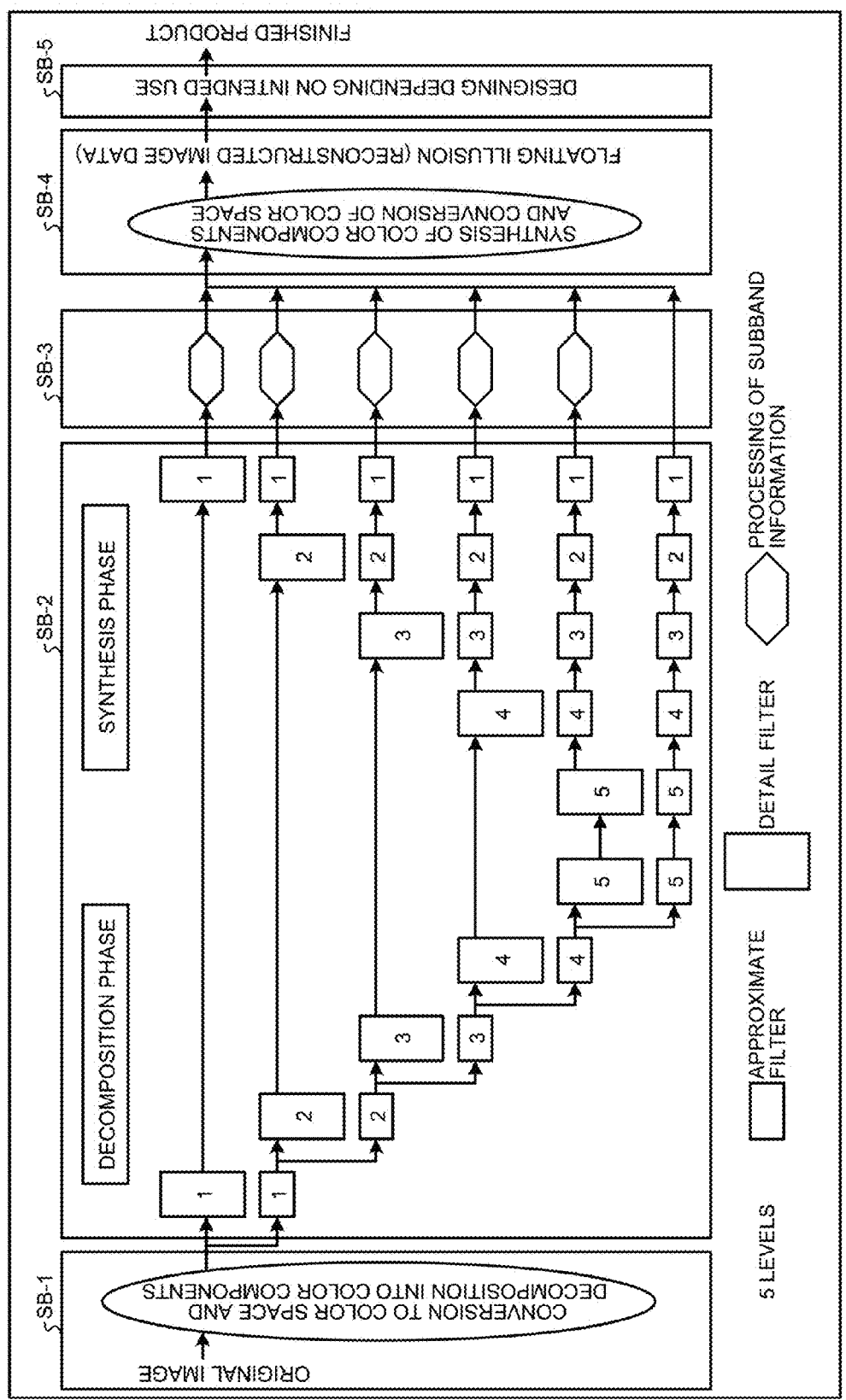
FIG. 9 is a flowchart illustrating one example of the specific processing performed by the illusion image generating apparatus 100 according to the present embodiment.

Next, details of the processing that further specifically explain the basic processing performed by the illusion image generating apparatus 100 will be described with reference to FIG. 9 to FIG. 47. FIG. 9 is a flowchart illustrating one example of the specific processing performed by the illusion image generating apparatus 100 according to the present embodiment. For this specific processing, an explanation will be given of color space conversion processing and decomposition and synthesis processing of color components necessary for a color image, processing of designing reconstructed image data depending on the intended use, printing processing for obtaining finished products, and the like in addition to the specific examples of the basic processing described above.

(Step SB-1)

First, a user prepares the original image (such as a character string, an illustration, or a photograph) that is desired to be floated due to an illusion and stores it in the image data file 106b via the input device 112 or the like.

When the stored image data is a color image, the illusion image generating apparatus 100 converts the color space to the CIELAB color space by the processing performed by the color space conversion unit 102d. Consequently, the image is decomposed into three color components, i.e., L* (brightness), a* (red-green), and b* (yellow-blue). When the image data is grayscale, the color space conversion unit 102d does not perform processing relating to the color space.

(Step SB-2)

Then, the decomposing unit 102a performs maximal overlap multiresolution decomposition by using pinwheel framelets on each color component (one color in the case of grayscale) of the original image that is an input signal. In this embodiment, an explanation is given when pinwheel framelets of degree 7 are used; however, similar image processing can be performed also by using wavelet frames of other degrees or with different orientation selectivity. As other examples, a simple pinwheel framelet may be used (see Non Patent Literature 2). Alternatively, a pinwheel wavelet frame can also be used (see Non Patent Literature 3). Moreover, multiresolution decomposition, such as maximally decimated multiresolution decomposition or partially decimated and partially overlap multiresolution decomposition, may be performed without being limited to maximal overlap multiresolution decomposition.

(Step SB-3)

Then, the reconstructing unit 102b does not sum all the subband signals obtained by performing maximal overlap multiresolution decomposition by the decomposing unit 102a but performs processing of deleting certain subband signals, adding certain subband signals without modifying them, and adding certain subband signals after amplifying them by the floating illusion creating unit 102c. A floating illusion image is obtained by arranging the images each obtained by processing the original image by this processing method. Examples of a processing method will be described below by classifying them into some cases. In the following examples, the floating illusion creating unit 102c increases or reduces subband signals by setting the coefficients $b_{k,n}$ illustrated in FIG. 6. No operation is performed on the coefficient $a_k$ of the approximate part ($a_k=A=1$).

(I) Processing Method for Creating an Illusion of Longitudinal Wavering when an Image is Moved Laterally Using a Grayscale Character String An explanation will be given of, for example, the processing method for generating an illusion image that wavers longitudinally when being moved laterally by processing the Kanji character string which means "Japan Science and Technology Agency" as illustrated in FIG. 10. The illusion image can be generated in a similar manner with other character strings. In this example, the subband signals are amplified or attenuated by processing the images in FIG. 10 by processing methods I-1 and I-2 such that the images have floating directions opposite to each other and then the images are combined, thereby enhancing the floating illusion by floating the images in opposite directions along the same axis in two adjacent image regions. FIG. 11 is a diagram illustrating the processing table used in the processing method I-1. The positions of the coefficients in FIG. 6 correspond to the positions of the values in the processing table illustrated below.

In terms of the values 0, 1, and 2 in the processing table, the value 0 means that the corresponding subband signal is multiplied by 0, i.e., is deleted, the value 1 means that the corresponding subband signal is multiplied by 1, i.e., is not processed, and the value 2 means that the corresponding subband signal is amplified by a factor of 2. For example, because the value at the position of the coefficient $b_{k,1}$ of the detail part $d_k(1)$ at level k in the processing table is one, no change is made to $d_k(1)$. Because the value at the position corresponding to $b_{k,9}$ in the processing table is zero, $d_k(9)$ is deleted. Because the value at the position corresponding to $b_{k,64}$ in the processing table is two, $d_k(64)$ is doubled.

Figures 12, 13:
FIG. 12 is a diagram illustrating the reconstructed image y obtained by the processing method I-1.
FIG. 13 is a diagram illustrating the processing table used in a processing method I-2.

The reconstructing unit 102b obtains the reconstructed image y, which creates a floating illusion, by setting the values in the processing table illustrated in FIG. 11 used in the processing method I-1 as coefficient values by the floating illusion creating unit 102c. FIG. 12 is a diagram illustrating the reconstructed image y obtained by the processing method I-1. Even a single reconstructed image y becomes an illusion image that wavers longitudinally when being moved laterally. FIG. 13 is a diagram illustrating the processing table used in the processing method I-2.

Figure 14:
FIG. 14 is a diagram illustrating the reconstructed image y obtained by the processing method I-2.

As illustrated in FIG. 13, the pattern in the processing table used in the processing method I-2 is such that the orientations of the target detail filters are set to be an inversion of to those in the pattern in the processing table used in the processing method I-1 about the axis in the longitudinal direction. In other words, the positive and negative signs of the angle of the orientations of the target detail filters that attenuate or amplify the subband signals are interchanged. FIG. 14 is a diagram illustrating the reconstructed image y obtained by the processing method I-2. This single reconstructed image y wavers longitudinally when being moved laterally and floats in the direction opposite to the reconstructed image y in FIG. 12 along the same axis.

Figure 15:
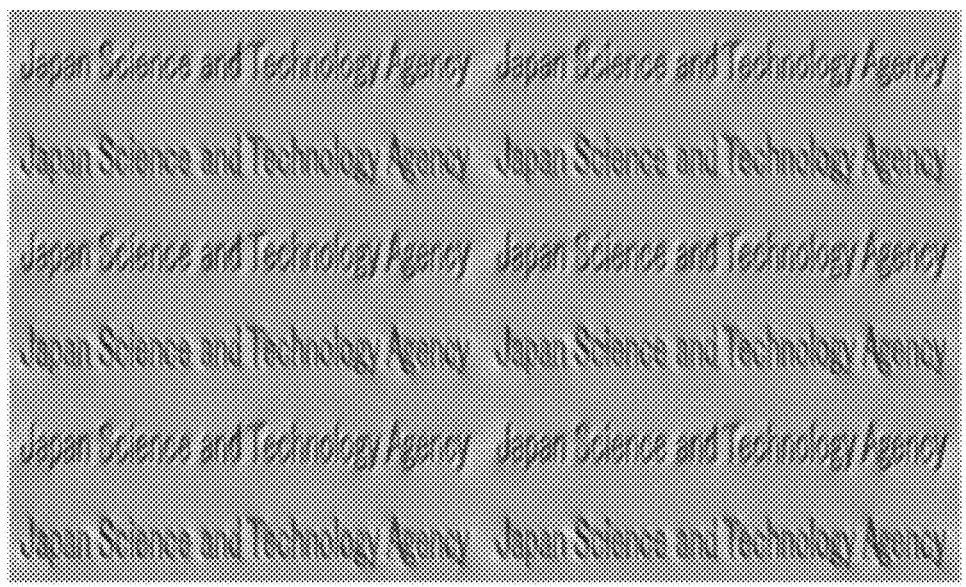
FIG. 15 is a diagram illustrating an illusion image generated by arranging the reconstructed images in FIG. 12 in odd rows and the reconstructed images in FIG. 14 in even rows.

Through the use of this property, the reconstructing unit 102b generates an illusion image in which the floating illusion is enhanced as illustrated in FIG. 15 by arranging the reconstructed images in FIG. 12 in odd rows and arranging the reconstructed images in FIG. 14 in even rows. In other words, because the character strings of adjacent image regions waver in opposite directions to each other, an image in which the illusion is enhanced can be obtained. In the above example, processing is performed up to level 5; however, the number of levels appropriate for a floating illusion changes depending on the size and the like of an image. Processing up to a lower level generates an image that is not far removed from the original image; however, if the number of levels is too small, the amount of illusion becomes small.

Figures 16, 17:
FIG. 16 is a diagram illustrating the processing table used in a processing method II-1.
FIG. 17 is a diagram illustrating the reconstructed image y obtained by the processing method II-1.

(II) Processing Method for Creating an Illusion of Lateral Wavering when an Image is Moved Longitudinally Using a Grayscale Character String In the above (I), an explanation is given of the processing method for creating an illusion of longitudinal wavering when an image is moved laterally. Next, an explanation will be given of a processing method for creating an illusion of lateral wavering when an image is moved longitudinally. In this example also, the subband signals are amplified or attenuated by processing the images in FIG. 10 by processing methods II-1 and II-2 and then the images are combined, thereby enhancing the floating illusion by floating the images in opposite directions to each other along the same axis in two adjacent image regions. FIG. 16 is a diagram illustrating the processing table used in the processing method II-1.

Figures 18, 19:
FIG. 18 is a diagram illustrating the processing table used in a processing method II-2.
FIG. 19 is a diagram illustrating the reconstructed image y obtained by the processing method II-2.

The reconstructing unit 102b obtains the reconstructed image y, which creates a floating illusion, by setting the values in the processing table illustrated in FIG. 16 used in the processing method II-1 as coefficient values by the floating illusion creating unit 102c. FIG. 17 is a diagram illustrating the reconstructed image y obtained by the processing method II-1. Even a single reconstructed image y becomes an illusion image that wavers laterally when being moved longitudinally. FIG. 18 is a diagram illustrating the processing table used in the processing method II-2.

As illustrated in FIG. 18, the pattern in the processing table used in the processing method II-2 is such that the orientations of the target detail filters are set to be an inversion of those in the pattern in the processing table used in the processing method II-1 about the axis in the longitudinal direction. In other words, the positive and negative signs of the angle of the orientations of the target detail filters that attenuate or amplify the subband signals are interchanged. FIG. 19 is a diagram illustrating the reconstructed image y obtained by the processing method II-2. This single reconstructed image y wavers laterally when being moved longitudinally and floats in the direction opposite to the reconstructed image y in FIG. 17 along the same axis.

Figure 20:
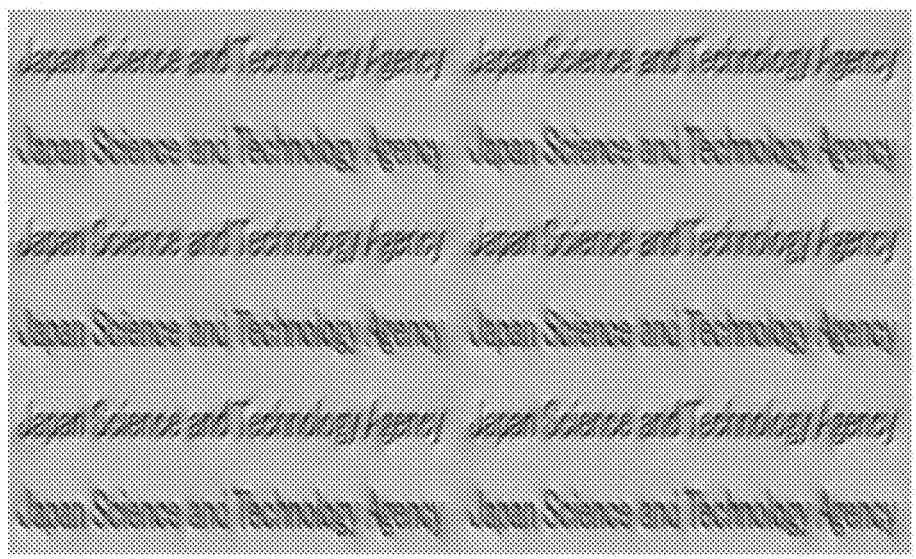
FIG. 20 is a diagram illustrating an illusion image generated by arranging the reconstructed images in FIG. 17 in odd rows and the reconstructed images in FIG. 19 in even rows.

Through the use of this property, the reconstructing unit 102b generates an illusion image in which the floating illusion is enhanced as illustrated in FIG. 20 by arranging the reconstructed images in FIG. 17 in odd rows and arranging the reconstructed images in FIG. 19 in even rows. In other words, because the character strings of adjacent image regions waver in opposite directions to each other, an image in which the illusion is enhanced can be obtained.

The above description is an explanation of the processing examples (I) and (II) of the grayscale character string. In the case of grayscale, brightness is expressed by 256 levels between 0 and 255; however, the value of the brightness after the processing exceeds the range of 0 to 255 in some cases. In such a case, two types of display methods performed by the illusion image output unit 102e are considered. One is the method (normalizing method) of making the value fall within the range of 0 to 255 by scaling the entire range of the gray scale values. The above character string is displayed by this method. The other method is the method (method in which a threshold is used) of setting any value less than or equal to 0 to 0 and replacing any value equal to or greater than 255 with 255.

(III) Processing Method for Creating an Illusion of Lateral Wavering when an Image is Moved Longitudinally Using a Color Image An explanation will be given of a processing method for creating an illusion of lateral wavering when an image is moved longitudinally using a color image. In the case of a color image, first, the color space conversion unit 102d converts the original image to the color space CIELAB so as to decompose the image into the components, i.e., L* (brightness), a* (red-green), and b* (yellow-blue), which are processing targets. The processing target may be selected depending on the intended use, such as processing only L* (brightness) and processing all of L*, a*, and b*.

For example, the amount of illusion increases in the case of processing all of L*, a*, and b* compared with the case of processing only L*; however, an image becomes more different from the original image in the case of processing all of L*, a*, and b* than the case of processing only L*. The processing method can be selected depending on whether the emphasis is put on the image quality being close to the original image or increasing the amount of illusion. Moreover, before actually displaying and outputting or printing out the image by the illusion image output unit 102e, the color space conversion unit 102d synthesizes the image signals of the processed color components so as to restore the image to a color image (Step SB-4). Conversion to the color space sRGB or the like may be performed if necessary.

Figure 21:
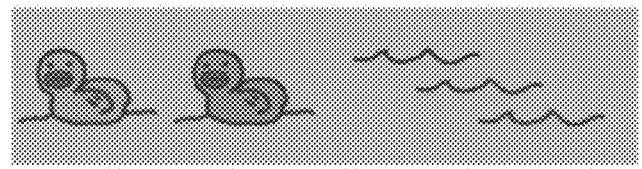
FIG. 21 is a diagram illustrating the original image of a color illustration.
Figure 22:
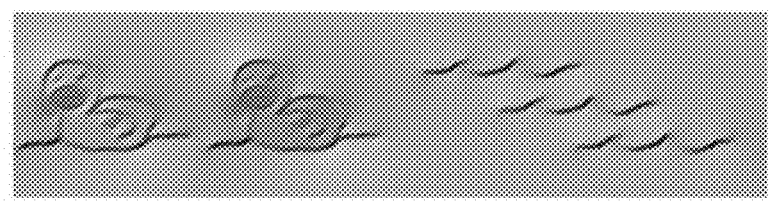
FIG. 22 is a diagram illustrating the reconstructed image obtained by processing the subband signals obtained from the original image in FIG. 21 by the processing method II-1.
Figure 23:
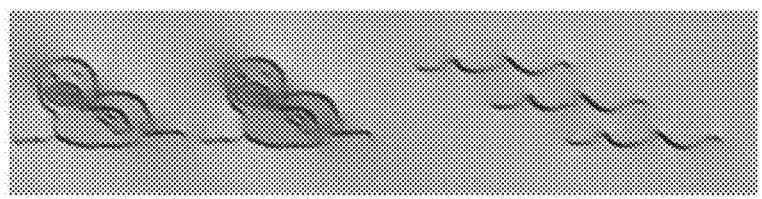
FIG. 23 is a diagram illustrating the reconstructed image obtained by processing the subband signals obtained from the original image in FIG. 21 by the processing method II-2.

In this embodiment, as an example, a method for creating a floating illusion from the original image that is a color illustration in FIG. 21 will be described. A floating illusion can be created in a similar manner also from other images (color photograph or the like). In a similar manner to the case of the floating illusion of the character string described above, the floating illusion creating unit 102c performs the two processing methods II-1 and II-2 for creating illusions of floating in opposite directions to each other. FIG. 22 is a diagram illustrating the reconstructed image obtained by processing the subband signals obtained from the original image in FIG. 21 by the processing method II-1. FIG. 23 is a diagram illustrating the reconstructed image obtained by processing the subband signals obtained from the original image in FIG. 21 by the processing method II-2. In this example, the maximum level is six and only L* (brightness) is processed. The display method by the illusion image output unit 102e is in accordance with the above-described method in which a threshold is used.

Figure 24:
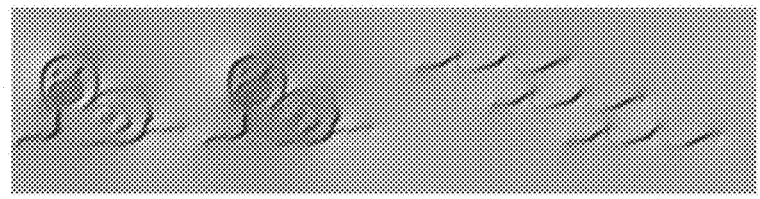
FIG. 24 is a diagram illustrating the reconstructed image obtained by processing the subband signals obtained from the original image in FIG. 21 by the processing method I-1.
Figure 25:
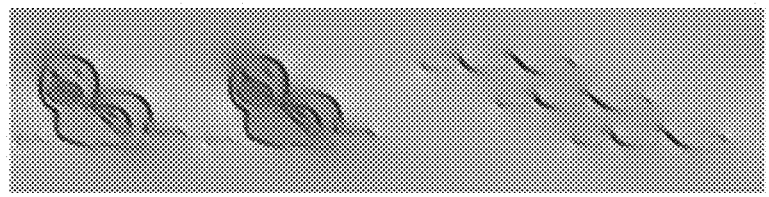
FIG. 25 is a diagram illustrating the reconstructed image obtained by processing the subband signals obtained from the original image in FIG. 21 by the processing method I-2.

(IV) Processing Method for Creating an Illusion of Longitudinal Wavering when an Image is Moved Laterally Using a Color Image In a similar manner, the processing method for creating an illusion of longitudinal wavering when an image is moved laterally from the color image in FIG. 21 will be described. In a similar manner to the floating illusion of the above-described character string, the floating illusion creating unit 102c performs the two processing methods I-1 and I-2 for creating illusions of floating in opposite directions to each other. FIG. 24 is a diagram illustrating the reconstructed image obtained by processing the subband signals obtained from the original image in FIG. 21 by the processing method I-1. FIG. 25 is a diagram illustrating the reconstructed image obtained by processing the subband signals obtained from the original image in FIG. 21 by the processing method I-2. In this example also, the maximum level is six and only L* (brightness) is processed.

(V) Other Variations of the Processing Table

Examples of a processing method and a processing table different from the above-described processing methods will be described. FIG. 26 and FIG. 27 are diagrams illustrating the processing tables used in processing methods V-1-1 and V-1-2 for generating an illusion image in which image regions waver laterally in opposite directions to each other when being moved longitudinally. FIG. 28 and FIG. 29 are diagrams illustrating the processing tables used in processing methods V-2-1 and V-2-2 for generating an illusion image in which image regions waver longitudinally in opposite directions to each other when being moved laterally. $M_1$ to $M_6$ are real numbers equal to or greater than one and are preferably around two. In this example, in the detail filters that belong to one group among two groups, i.e., the group composed of the "(3) detail filters with orientations that are at a positive angle relative to the orthogonal axis" and the group composed of the "(4) detail filters with orientations that are at a negative angle relative to the orthogonal axis", the subband signals are deleted that correspond to the detail filters that include those up to a higher degree as the angle approaches 0° and those up to a lower degree as the angle approaches 45° among the detail filters with orientations that are tilted greater than 0° and less than or equal to 45° relative to the orthogonal axis of the floating direction.

Although the illusion effect is relatively low, these processing methods V-1 and V-2 can reproduce an image closer to the original image. In the processing method V-2-1 and the processing method V-2$^{-2}$, if $M_1= \ldots =M_6=1$, it is possible to generate the reconstructed image obtained by removing illusion components from the original image of a character string tilted illusion.

As a contrast, an explanation will be given, with reference to FIG. 30 to FIG. 33, of examples of a processing method and a processing table with which the reconstructed image becomes relatively different from the original image even though the amount of illusion increases. FIG. 30 and FIG. 31 are diagrams illustrating the processing tables used in processing methods V-3-1 and V-3-2 for generating an illusion image in which image regions waver laterally in opposite directions to each other when being moved longitudinally. FIG. 32 and FIG. 33 are diagrams illustrating the processing tables used in processing methods V-4-1 and V-4-2 for generating an illusion image in which image regions waver longitudinally in opposite directions to each other when being moved laterally. In this example, the subband signals corresponding to all the detail filters with orientations that belong to one group among the two groups (3) and (4) are deleted. If $M_1=\ldots=M_6=2$, the processing tables become the same as the processing tables used in the processing methods I and II.

An explanation will be given, with reference to FIG. 34 to FIG. 35, of other examples of a processing table with which the reconstructed image becomes different from the original image even though the illusion is enhanced. FIG. 34 and FIG. 35 are diagrams illustrating the processing tables used in processing methods V-5-1 and V-5-2 for generating a floating illusion image that wavers laterally when being moved longitudinally and waver longitudinally when being moved laterally. As illustrated in FIG. 34 and FIG. 35, in this example, in order to set both the longitudinal direction and the lateral direction as the floating direction, the subband signals corresponding to the detail filters with an orientation in the longitudinal direction and the detail filters with an orientation in the lateral direction are deleted. The processing methods V-1 to 5 are representative examples of variations and a processing table that interpolates the processing methods V-1 to 5 may be used.

Figure 36:
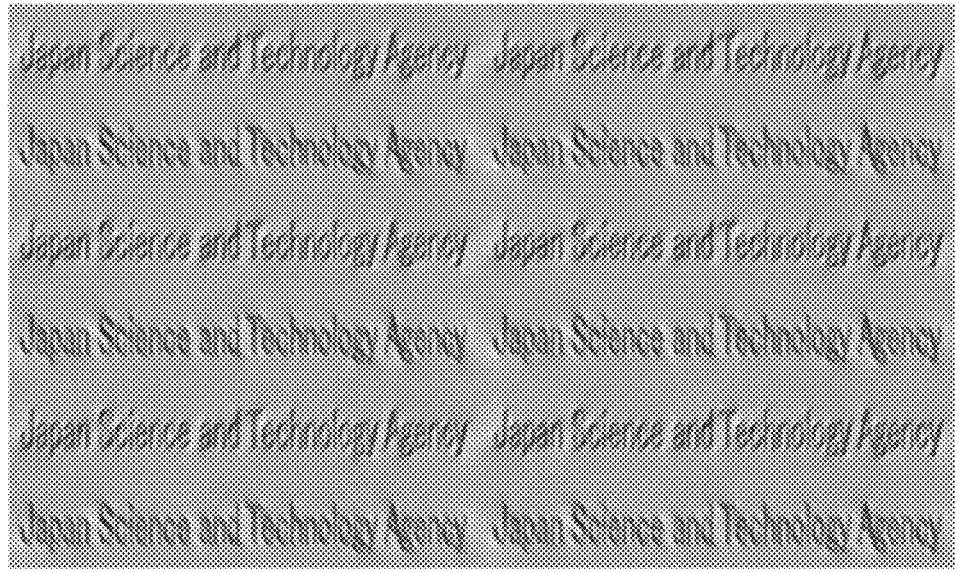
FIG. 36 is a diagram illustrating an illusion image generated by the processing method I.
Figure 37:
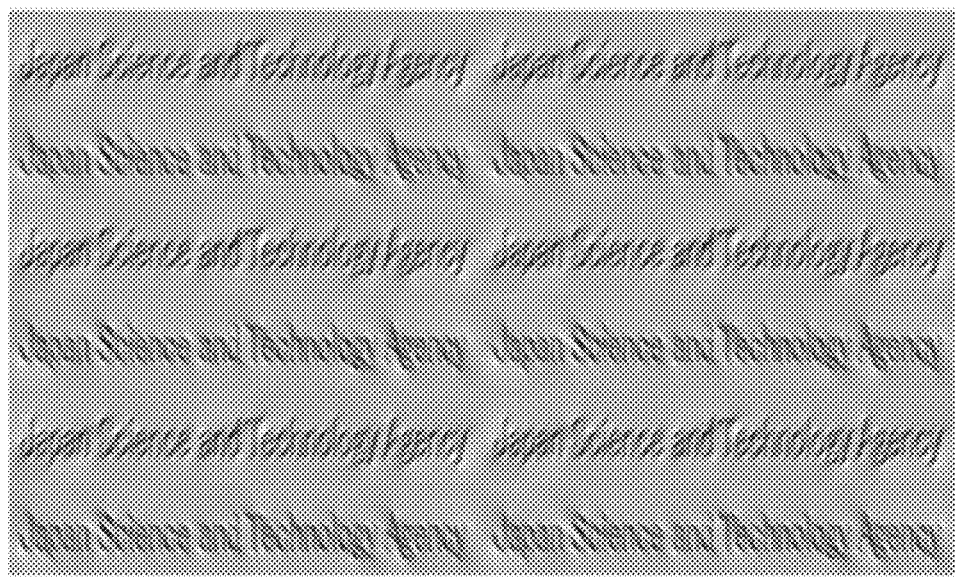
FIG. 37 is a diagram illustrating an illusion image generated by the processing method V-5.
Figure 38:
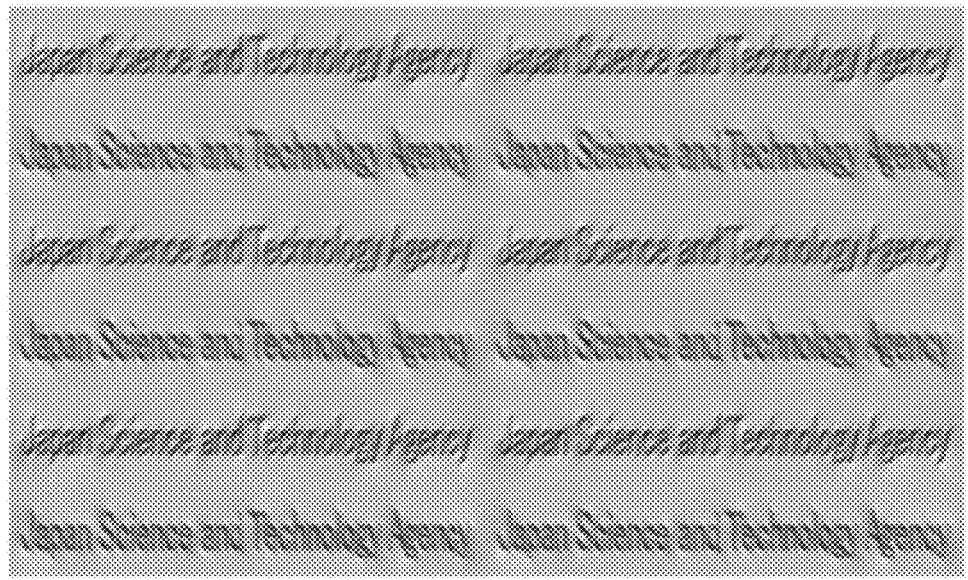
FIG. 38 is a diagram illustrating an example of an illusion image obtained by arranging two reconstructed images alternatively in odd rows and even rows and combining the images, where the two reconstructed image are generated by using the processing tables between which the orientations are inverted relative to each other with respect to the axis.
Figure 39:
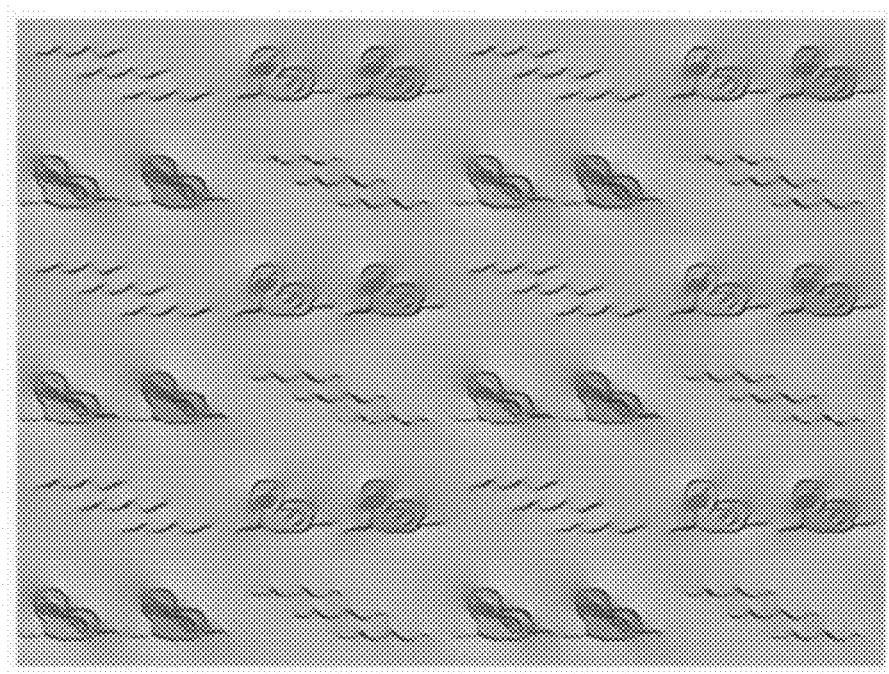
FIG. 39 is a diagram illustrating an example of an illusion image obtained by arranging images such that images in one of the odd rows and the even rows are shifted by ½ of the image length.
Figure 40:
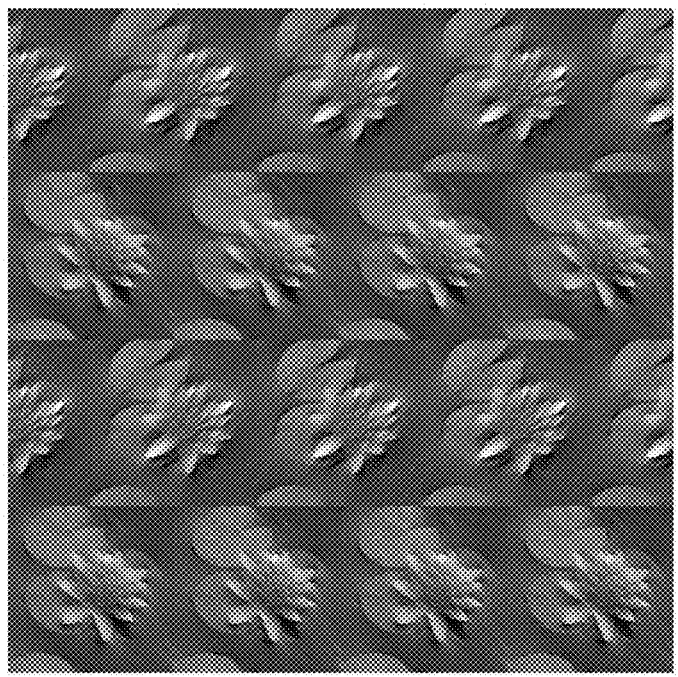
FIG. 40 is a diagram illustrating an example of an illusion image obtained by arranging images such that images in one of the odd rows and the even rows are shifted by ½ of the image length.

FIG. 36 is a diagram illustrating the illusion image generated by the processing method I and FIG. 37 is a diagram illustrating the illusion image generated by the processing method V-5. As illustrated in FIG. 37, the illusion image in FIG. 37 wavers laterally when being moved longitudinally and wavers longitudinally when being moved laterally due to an illusion. However, the shape of the characters is different from the original image compared with FIG. 36 by the processing method I.

(VI) Processing Method for Creating an Illusion of Floating in an Oblique Direction The above-described examples use the processing tables that create an illusion of wavering in the right and left (lateral) direction when an image is moved up and down (longitudinally) or an illusion of wavering in the up and down (longitudinal) direction when an image is moved right and left (laterally), and an explanation will be given of an example of, when an image is moved in an oblique direction (for example, θ=+45°), creating an illusion of wavering in an oblique direction (for example, θ=−45° orthogonal to the above direction. FIG. 45 and FIG. 46 are diagrams illustrating the processing tables used in processing methods VI-1 and VI-2 for generating an image that creates, when being moved in an oblique direction, illusions of wavering in oblique directions that are orthogonal to the above direction and are opposite to each other.

As illustrated in FIG. 45 and FIG. 46, the processing tables used in the processing methods VI-1 and VI-2 are tables obtained by rotating the processing tables ($M_1=\ldots=M_6=2$) used in the processing methods V-5-1 and V-5-2 illustrated in FIG. 34 and FIG. 35 for 45° in clockwise direction. In other words, the orientations of the target detail filters that attenuate or amplify the subband signals are shifted by 45°.

Figure 47:
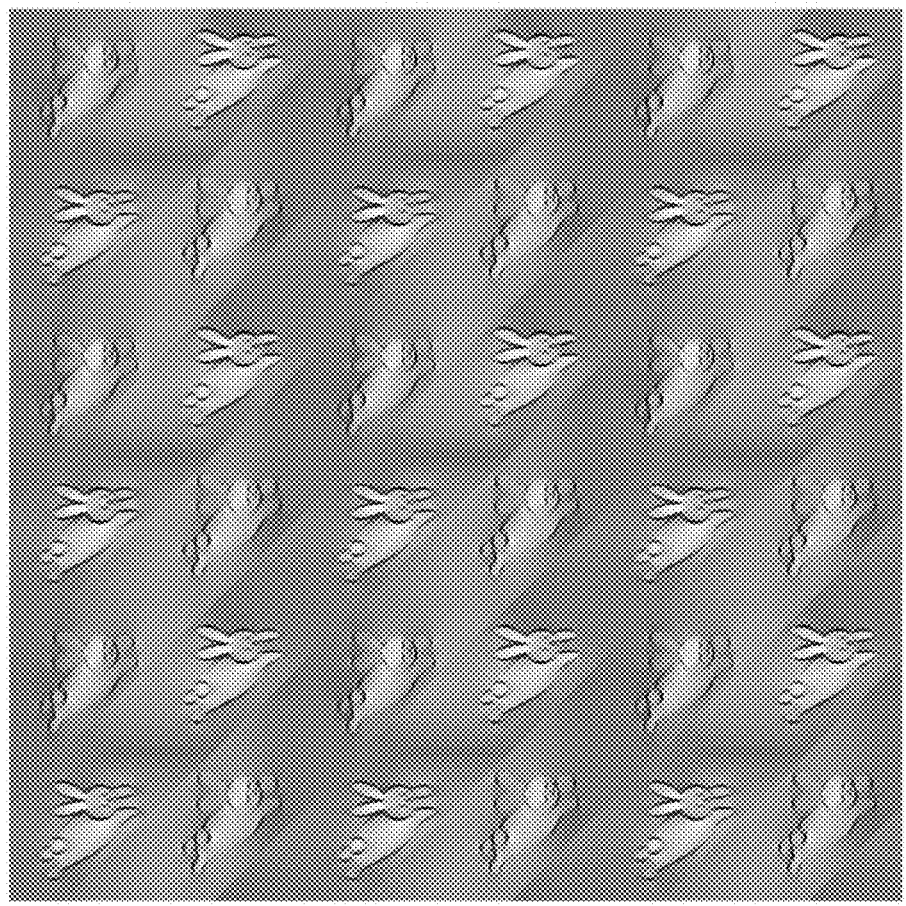
FIG. 47 is a diagram illustrating an illusion image generated by the processing methods VI-1 and VI-2 such that adjacent image regions waver in opposite directions to each other.

FIG. 47 is a diagram illustrating the illusion image generated by the processing methods VI-1 and VI-2 such that color illustrations of adjacent image regions waver in opposite directions to each other. As illustrated in FIG. 47, when this illusion image is moved in an oblique direction, the image appears to float in the direction vertical to the oblique direction. In this manner, it is possible to change the direction in which an image floats by shifting the orientations of the target detail filters that attenuate or amplify the subband signals by an arbitrary angle in the processing table described above. This can be used to enhance the floating illusion such that images float in different directions other than the directions opposite to each other in adjacent image regions.

(Step SB-5)

As described above with the character strings and the color illustrations as examples, the floating illusion is enhanced by arranging images such that the floating directions due to an illusion are opposite to each other in adjacent image regions. For example, the reconstructing unit 102b combines images by arranging two reconstructed images that are generated by the floating illusion creating unit 102c using the processing tables between which the positive and negative signs of the angle of the orientations are interchanged, alternatively in odd rows and even rows (see FIG. 38). The arranging method is not limited to this and various arranging methods are considered. For example, the images may be arranged such that the images in one of the odd rows and the even rows are shifted by ½ of the image length (see FIG. 39 and FIG. 40). Moreover, the floating illusion may be enhanced by arranging images such that, in adjacent image regions, the floating directions due to an illusion are different from each other, with the floating directions not being limited to the directions opposite to each other.

Figure 41:
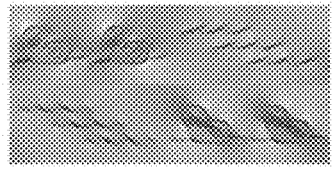
FIG. 41 is a diagram in which illusion images that are prepared for generating circular arrays and waver laterally in opposite directions are arranged one above the other.
Figure 42:
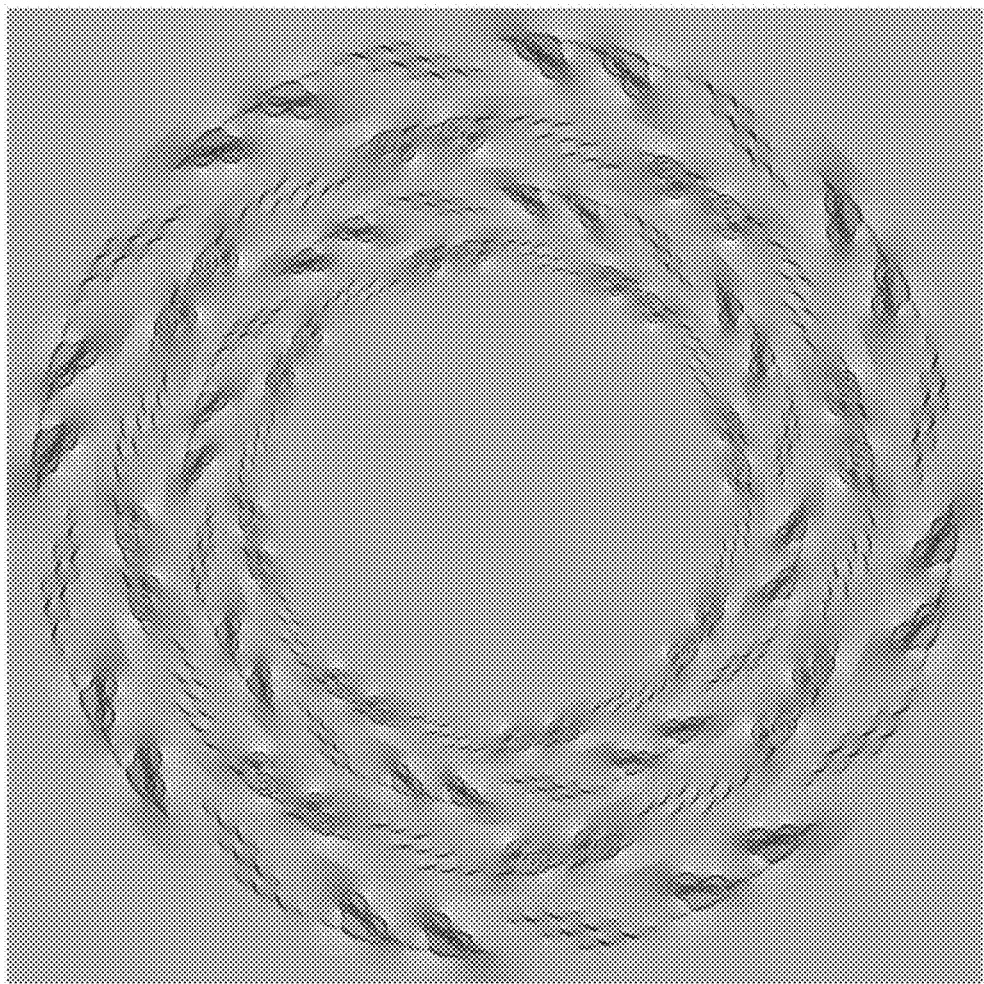
FIG. 42 is a diagram illustrating an illusion figure that appears to rotate when approaching or moving away from the figure.
Figure 43:
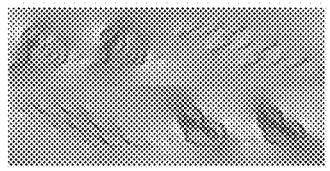
FIG. 43 is a diagram illustrating a floating illusion image that is prepared for generating circular arrays and wavers longitudinally when being moved laterally.

Moreover, images may be arranged in a circle and are not limited to being arranged in parallel. First, as illustrated in FIG. 41, images that waver laterally in opposite directions when being moved longitudinally are arranged one above the other to enhance the illusion. In this example, although the figures are shifted laterally by ½ of the figure between the upper and lower stages, this is for design reasons and is not essential. Then, when the appropriate number of the images in FIG. 41 are concentrically arranged, as illustrated in FIG. 42, it is possible to generate an illusion figure with which the circular arrays appear to rotate alternately when approaching or moving away from the figure. In the example in FIG. 42, the images in FIG. 41 are reduced logarithmically toward the center. Moreover, a polar coordinate conversion is used for arranging the images in circles.

Figure 44:
FIG. 44 is a diagram illustrating an illusion image that expands and contracts when being rotated.

When the floating illusion images (FIG. 43) that waver longitudinally when being moved laterally are arranged in circles, as illustrated in FIG. 44, an illusion image that appears to expand and contract when being rotated can be generated.

This is the end of the explanation of the specific processing performed by the illusion image generating apparatus 100.

[Example of High-Speed Calculation Method]

In the example of the specific processing described above with reference to FIG. 9, a large number of filtering calculations needs to be performed to calculate the processing in Steps SB-2 and SB-3 every time an image is input; therefore, a relatively long time is required. In this example, an example of a high-speed calculation method that shortens the filtering calculation time will be explained.

First, the control unit 102 (the decomposing unit 102a, the reconstructing unit 102b, and the like) inputs an unit impulse signal for an image size (the number of pixels), which is the same as that of the image signal, to a filterbank to be used (for example, the above-described filterbank in FIG. 8) instead of the image signal and stores in advance an output signal F in the storing unit 106, such as the framelet file 106a. The unit impulse signal is, for example, a signal in which the value of the upper left end is one and other values are all zero in the image signal.

Then, when a floating illusion image is generated, the control unit 102 calculates the cyclic convolution product x*F (also referred to as the circular convolution product) of an image x, on which the processing in Step SB-1 explained with reference to FIG. 9 is performed, and F (for example of the cyclic convolution product, see Hitoshi Arai, "Fourier Analysis", Asakura Publishing Co., Ltd. (2003)). The calculated x*F becomes the same as the reconstructed image y calculated by the specific processing described above with reference to FIG. 9.

In this manner, through the use of the high-speed calculation method of calculating the convolution product of the precalculated impulse response and the original image, when floating illusion images with the same image size (the number of pixels) are generated by the same processing method for a plurality of original images, the time and the amount of calculation can be considerably reduced. More specifically, in the example of the specific processing explained with reference to FIG. 9, 25 seconds are required to generate a floating illusion image for one original image; however, through the use of the high-speed calculation method, a floating illusion image can be generated in 2 seconds for one original image by precalculating the impulse response F (although it takes 23 seconds to calculate F).

[Scale Conversion of Brightness and Color]

Figure 48:
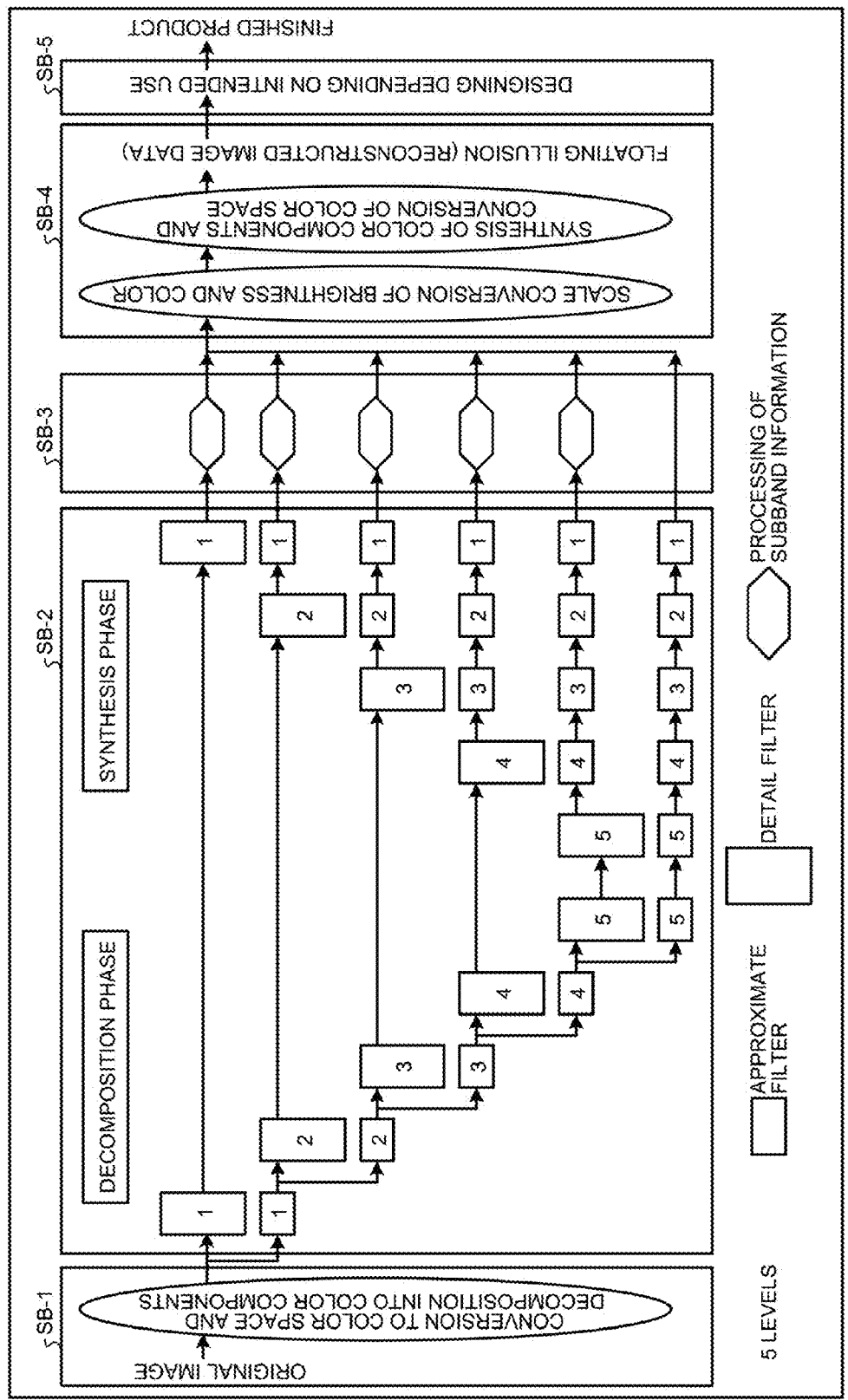
FIG. 48 is a diagram illustrating a flowchart of the specific processing improved by this example.

In the example of the specific processing explained above with reference to FIG. 9, an explanation is given of an example where, when the image data is a color image, the color space is converted to the CIELAB color space by the processing performed by the color space conversion unit 102d and L* (brightness) is set as a processing target in Step SB-1. Then, for Step SB-4, an explanation is mainly given of an example of applying the method in which a threshold is used that, when the value of the brightness after the processing exceeds the range of 0 to 255, sets a value less than or equal to 0 to 0 and replaces a value equal to or greater than 255 with 255. In this example, an explanation will be given of a method of the scale conversion of the brightness and color that can increase the amount of illusion or make an image more visible depending on the image by appropriately converting the scale of the brightness and color. FIG. 48 is a diagram illustrating a flowchart of the specific processing improved by this example. In this example, all of L*, a*, and b*, which are obtained by converting the color space to the CIELAB color space in Step SB-1, are set as a processing target.

As illustrated in FIG. 48, in this example, in Step SB-4, processing of the scale conversion of the brightness and color is added. The processing of the scale conversion of the brightness and color performed by the color space conversion unit 102d is as follows.

That is, as described above, the control unit 102 performs the processing (high-speed calculation method may be used) in Steps SB-2 and SB-3 on all of L*, a*, and b* as a processing target. At this point, in the original image, for example, the values of L* are in the range of equal to or greater than 0 and equal to or less than 100; however, the values of L* of the image after the processing do not always fall between 0 and 100; therefore, if any processing is not performed, the value that is out of the range of equal to or greater than 0 and equal to or less than 100 is not displayed.

In this example, in Step SB-4, the color space conversion unit 102d performs the following scale conversion without applying the method in which a threshold is used. Specifically, A and B, which satisfies 0<A<B<100 are set in advance. The color space conversion unit 102d performs conversion as follows. That is, if the value after the processing is equal to or less than A, the color space conversion unit 102d replaces the value with A; if the value after the processing is equal to or greater than B, the color space conversion unit 102d replaces the value with B; and if the value after the processing is in a range of equal to or greater than A and less than or equal to B, the color space conversion unit 102d increases or decreases the value such that the value falls within the range of equal to or greater than 0 and less than or equal to 100. The following linear equation, for example, may be used as the conversion method.

$$x \to \frac{100}{B-A}(x-A)$$

Figure 49:
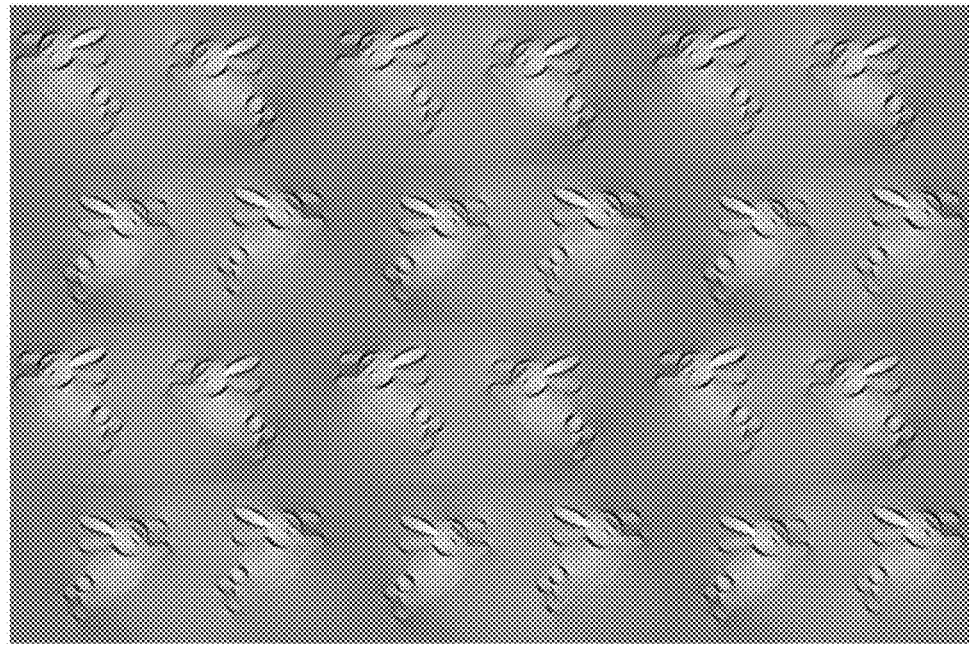
FIG. 49 is a diagram illustrating the result obtained by performing the scale conversion by the method in which a threshold is used in the above-described specific processing.
Figure 50:
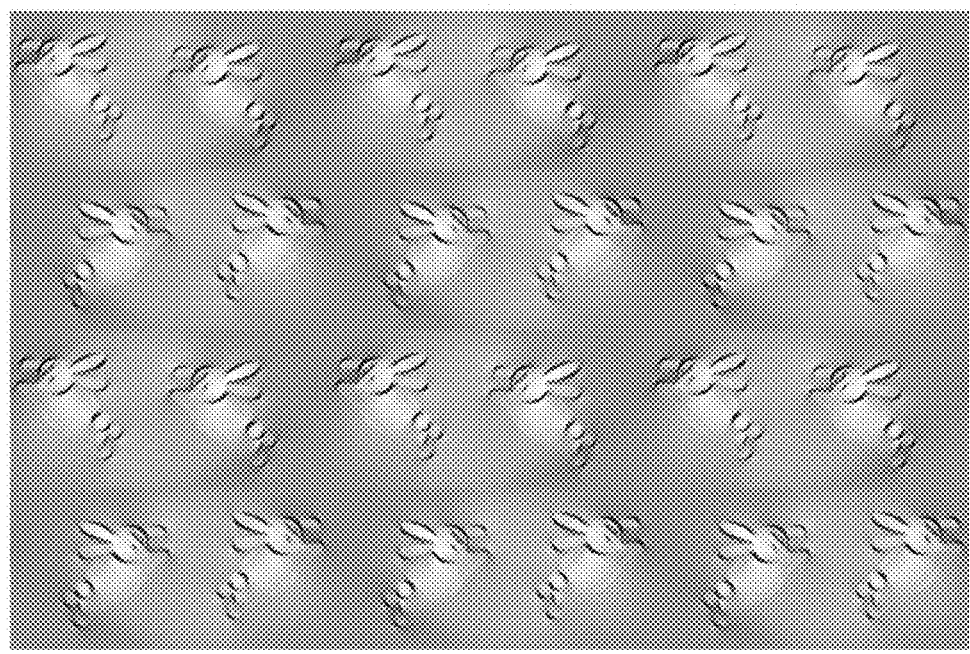
FIG. 50 is a diagram illustrating the result obtained by performing the scale conversion under the condition where A is 15 and B is 85 in this example.

In the above description, the scale conversion is performed on the values of L*; however, the scale conversion may be performed in a similar manner also on the values of a* and b*. FIG. 49 is a diagram illustrating the result obtained by performing the scale conversion by the method in which a threshold is used in the above-described specific processing. FIG. 50 is a diagram illustrating the result obtained by performing the scale conversion under the condition where A is 15 and B is 85 in this example.

Figure 51:
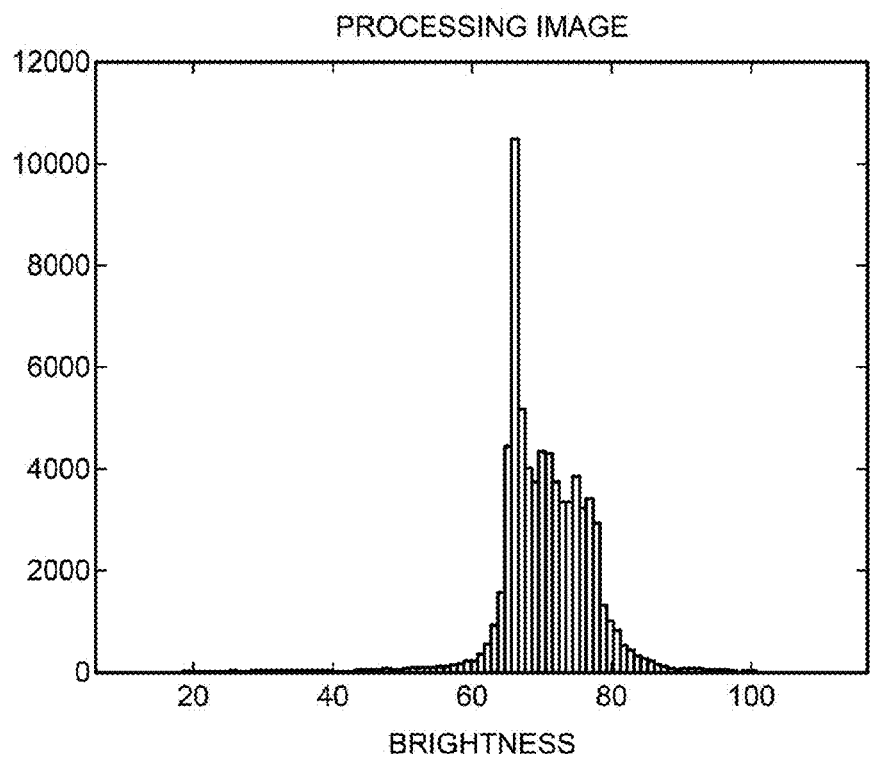
FIG. 51 is a histogram of L* for an image after the processing in Step SB-3 and before the processing in Step SB-4 in the specific processing performed on an input image for the output images in FIG. 49 and FIG. 50.
Figure 52:
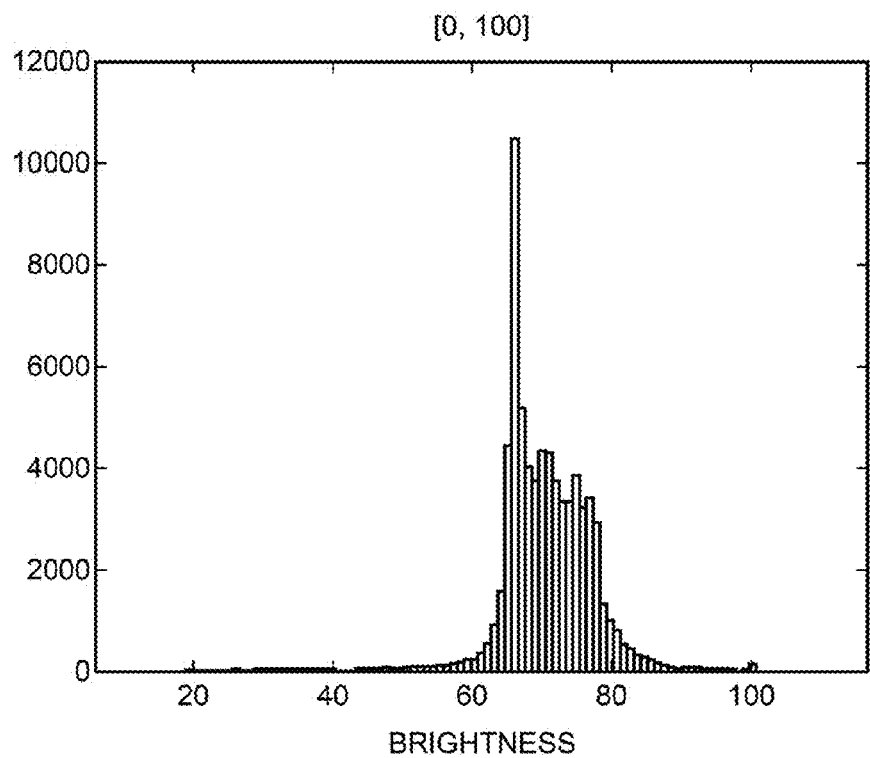
FIG. 52 is a histogram of L* for an image (FIG. 49) obtained by performing the scale conversion on the image after the processing in Step SB-3 simply by using a threshold.
Figure 53:
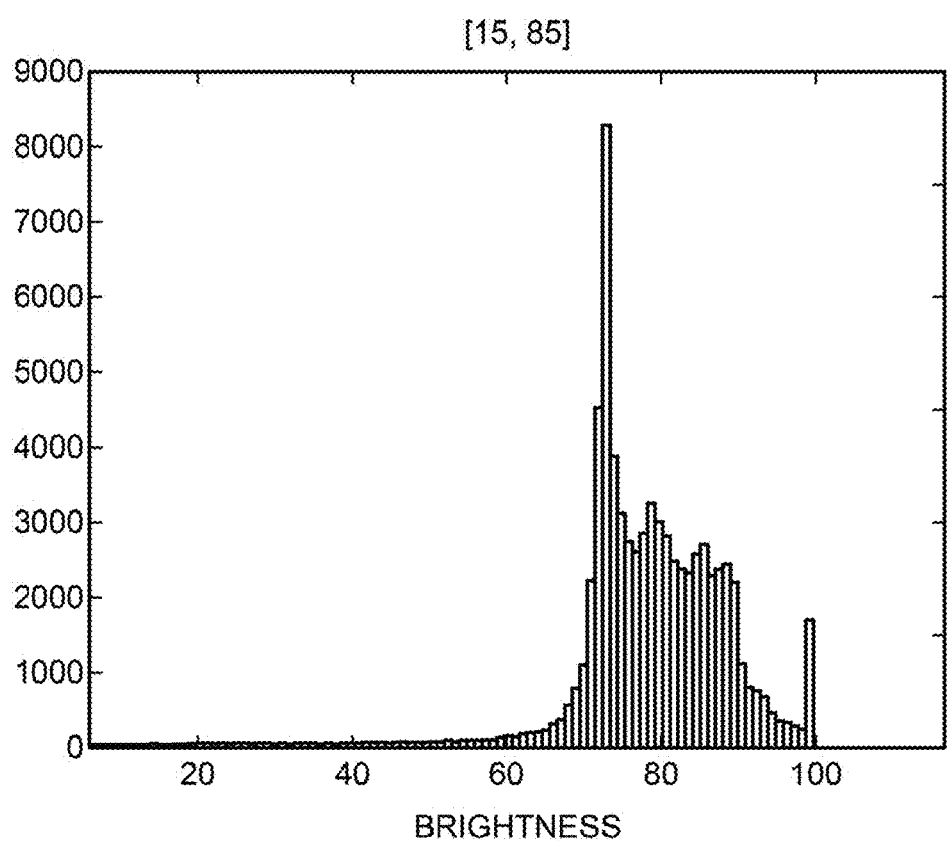
FIG. 53 is a histogram of L* for an image (FIG. 50) obtained by performing the scale conversion on the image after the processing in Step SB-3 under the condition where A is 15 and B is 85 in this example.

It can be seen that the image in FIG. 50 in this example has a larger amount of illusion and is more clear than the image in FIG. 49. An explanation will be given of a comparison of the histograms of the brightness values. FIG. 51 is a histogram of L* for an image after the processing in Step SB-3 and before the processing in Step SB-4 in the specific processing. FIG. 52 is a histogram of L* for an image obtained by performing the scale conversion on the image after the processing in Step SB-3 simply by using a threshold. FIG. 53 is a histogram of L* for an image obtained by performing the scale conversion on the image after the processing in Step SB-3 under the condition where A is 15 and B is 85 in this example.

As illustrated in FIG. 51, in the image before the scale conversion processing, some values exceed 100. When the scale conversion is performed in this example (FIG. 53), the brightness peaks at a higher value than the case of performing a simple scale conversion using a threshold (FIG. 52); therefore, the entire image becomes bright. Moreover, according to this example, because the spread of the distribution becomes large, the gradation is clear and the amount of illusion is increased. In this manner, if the scale conversion is performed by the method in this example, effects are obtained where an image becomes more visible or the amount of illusion is increased depending on the image. Because each image has a suitable scale conversion method, the values of A and B can be arbitrarily selected depending on the image.

[Pinwheel Framelet]

In the present embodiment, as described above, a pinwheel framelet to be used as an example may be a wavelet frame with orientation selectivity, such as well-known simple pinwheel framelet or pinwheel wavelet frame, or a filterbank with orientation selectivity. A pinwheel framelet will be described below.

For the symmetric matrix given by $A=(A_{k,l}):(n+1)\times(n+1)$, a matrix that satisfies $A_{s,t}=A_{n-s,t}=A_{s,n-t}=A_{n-s,n-t}=s$ is determined, where degree n is odd and n≥3, s=0, 1, ..., [n/2], and t=s, ..., [n/2]. [ ] is Gauss symbol.

If n=7, the following matrix satisfies the condition.

$$A = \begin{pmatrix} 0 & 0 & 0 & 0 & 0 & 0 & 0 & 0 \\ 0 & 1 & 1 & 1 & 1 & 1 & 1 & 0 \\ 0 & 1 & 2 & 2 & 2 & 2 & 1 & 0 \\ 0 & 1 & 2 & 3 & 3 & 2 & 1 & 0 \\ 0 & 1 & 2 & 3 & 3 & 2 & 1 & 0 \\ 0 & 1 & 2 & 2 & 2 & 2 & 1 & 0 \\ 0 & 1 & 1 & 1 & 1 & 1 & 1 & 0 \\ 0 & 0 & 0 & 0 & 0 & 0 & 0 & 0 \end{pmatrix}$$

If the matrix is given by $B=(B_{k,l}):(n+1)\times(n+1)$, B is a matrix satisfying the following condition (P).

$$\text{Condition}(P): \begin{cases} B_{k,l} = B_{l,k} \\ B_{k,l} = B_{n-k,l} = B_{k,n-1} = B_{n-k,n-1} \\ B_{k,l} \geq 0 \end{cases}$$

$n_0 = \left[\frac{n}{2}\right]$ there are $\frac{1}{2}(n_0+1)(n_0+3)$ free variables.

$$F^1_{k,l}(\theta_1, \theta_2) = \frac{1}{2}|\det M|^{1/2} t^{k+l+A_{k,l}} e^{-\pi i \theta_1} e^{-\pi i \theta_2}$$

-continued $$\sqrt{B_{k,l}} \cos^{n-k-A_{k,l}}(\pi x)\sin^{k-A_{k,l}}(\pi x)\times\cos^{n-l-A_{k,l}}(\pi y)$$

$$\sin^{l-A_{k,l}}(\pi y)\times(-\cos(\pi x)\sin(\pi x)+\cos(\pi y)\sin(\pi y))^{A_{k,l}}$$

$$F_{k,l}^2(\theta_1,\theta_2) = \frac{1}{2}|\det M|^{1/2} i^{k+l+A_{k,l}} e^{-\pi i\theta_1} e^{-\pi i\theta_1} e^{-\pi i\theta_2} \sqrt{B_{k,l}}$$

$$\cos^{n-k-A_{k,l}}(\pi x)\sin^{k-A_{k,l}}(\pi x)\times\cos^{n-l-A_{k,l}}(\pi y)$$

$$\sin^{l-A_{k,l}}(\pi y)\times(\cos(\pi x)\sin(\pi x)+\cos(\pi y)\sin(\pi y))^{A_{k,l}}$$

where M is a sampling matrix of a rectangular grid, a quincunx grid, or a hexagonal grid.

$$f_{k,l}^1 \leftrightarrow F_{k,l}^1; f_{k,l}^2 \leftrightarrow F_{k,l}^2$$

$\Lambda_f = \{(0,0), (0,n), (n,0), (n,n)\}$ $\Lambda_g = \{(k,1)\}_{k=0,n;l=1,\ldots,n-1} \cup \{(k,l)\}_{l=0,n;k=1,\ldots,n-1}$ $\Lambda_a = \{(k,l)\}_{k=1,\ldots,n-1;l=1,\ldots,n-1}$ $P_n = \{\sqrt{2} f_{k,l}^1\}_{(k,l)\in\Lambda_f\cup\Lambda_g} \cup \{f_{k,l}^1\}_{(k,l)\in\Lambda_a} \cup \{f_{k,l}^2\}_{(k,l)\in\Lambda_a}$ Lemma 2 (H.&S. Arai, 2008) The necessary and sufficient condition that Pn be a framelet filter relating to a rectangular grid, a quincunx grid, or a hexagonal grid is that $B=(B_{k,l})$ satisfies the following condition.

$$\sum_{k=0}^{n}\sum_{l=0}^{n}\sum_{j=1}^{2}|F_{k,l}^j(\theta_1,\theta_2)|^2 \equiv |\det M|$$

<Method of Determining $B=(B_{k,l})$ Satisfying the Above Condition>

$\{(k,l): k=0, 1, \ldots, n_0, l=s, \ldots, n_0,\}$ is ordered as follows.

| (0,0) | (0,1) | (0,2) | ... | (0, $n_0$ − 1) | (0, $n_0$) |
|---|---|---|---|---|---|
|  | (1,1) | (1,2) | ... | (1, $n_0$ − 1) | (1, $n_0$) |
|  |  |  | ⋱ | ⋮ | ⋮ |
|  |  |  |  | ($n_0$ − 1, $n_0$ − 1) | ($n_0$ − 1, $n_0$ − 1) |
|  |  |  |  |  | ($n_0$, $n_0$) |

↕

| 1 | 2 | 3 | ... | $n_0$ | $n_0$ + 1 |
|---|---|---|---|---|---|
| $n_0$ + 2 | $n_0$ + 3 | ... | $2n_0$ | $2n_0$ + 1 |  |
|  |  |  | ⋱ | ⋮ | ⋮ |
|  |  |  |  | 1/2 $n_0(n_0$ + 3) − 1 | 1/2 $n_0(n_0$ + 3) |
|  |  |  |  |  | 1/2 ($n_0$ + 1)($n_0$ + 2) |

$\mu=(k,l), \nu=(k',l')$ $K_{\mu,\nu} = 2^{3-4n+4k}(-1)^l$ $$\sum_{p=0}^{k}\left\{\binom{2k}{2p}\left[\left[\sum_{q=0}^{2k-2p}(-1)^q\binom{-2k-2p+2n}{2k'-2p+n-q}\binom{2k-2p}{q}\right]\times\right.\right.$$
$$\left[\sum_{q=0}^{2p+2l-2k}(-1)^q\binom{2p+2n-2k-2l}{2l'+2p+n-2k-q}\binom{2p+2l-2k}{q}\right]+$$
$$\left[\sum_{q=0}^{2k-2p}(-1)^q\binom{-2k-2p+2n}{2l'-2p+n-q}\binom{2k-2p}{q}\right]\times$$
$$\left.\left.\left[\sum_{q=0}^{2p+2l-2k}(-1)^q\binom{2p+2n-2k-2l}{2k'+2p+n-2k-q}\binom{2p+2l-2k}{q}\right]\right\}\right.$$

$$\begin{pmatrix} K_{1,1} & \cdots & K_{1,\frac{1}{2}(n_0+1)(n_0+2)} \\ \vdots & \ddots & \vdots \\ K_{\frac{1}{2}(n_0+1)(n_0+2),1} & \cdots & K_{\frac{1}{2}(n_0+1)(n_0+2),\frac{1}{2}(n_0+1)(n_0+2)} \end{pmatrix} \begin{pmatrix} X_1 \\ X_2 \\ \vdots \\ X_{\frac{1}{2}(n_0+1)(n_0+2)} \end{pmatrix} = \begin{pmatrix} 4 \\ 0 \\ \vdots \\ 0 \end{pmatrix}$$

$$B_{k,l} = \begin{cases} 2X_s & s = \frac{1}{2}(k-1)(2n_0-k+4)+1, k=1,\ldots,n_0 \\ X_s & \text{or others} \end{cases}$$

Figure 54:
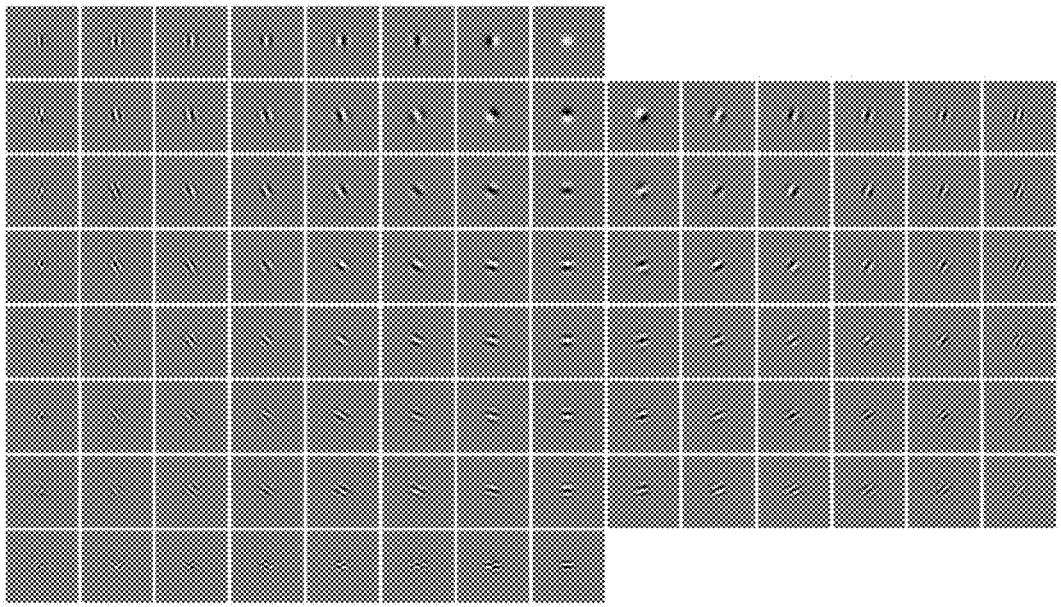
FIG. 54 is a diagram illustrating the filters obtained by calculating the cyclic correlation product of maximum overlap pinwheel framelet filters at level 2 of degree 7 and a maximal overlap pinwheel framelet approximate filter at level 1 of degree 7.
Figure 55:
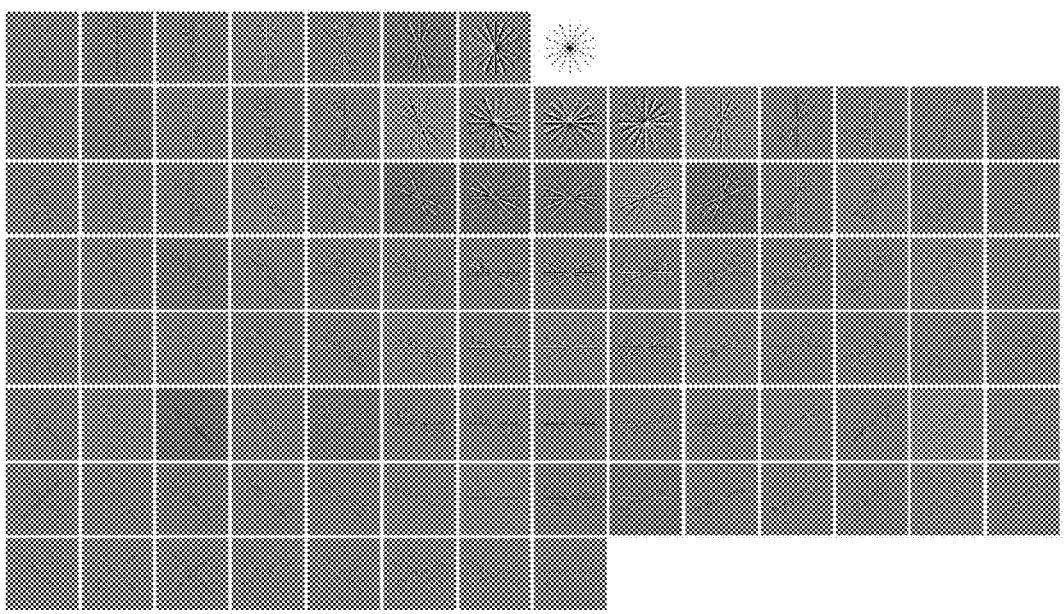
FIG. 55 is a diagram illustrating each subband signal of the result obtained by performing up to the 2nd stage of maximal overlap multiresolution decomposition by a pinwheel framelet of degree 7 on a test image.

Theorem 3 (H.&S. Arai, 2008) $B=(B_{k,l})$ determined above satisfies Lemma 2. Therefore, Pn is a framelet filter relating to a rectangular grid, a quincunx grid, or a hexagonal grid. Pn is referred to as a pinwheel framelet of degree n. FIG. 54 is a diagram illustrating the filters obtained by calculating the cyclic correlation product of maximum overlap pinwheel framelet filters at level 2 and an approximate filter at level 1. FIG. 55 is a diagram illustrating each subband signal of the result obtained by performing the 2nd stage of maximal overlap MRA decomposition by a pinwheel framelet on a test image.

This is the end of the explanation of the present embodiment. In this manner, according to the present embodiment, it is possible to provide an illusion image generating apparatus, an illusion image generating method, a printing medium manufacturing method, a program, and a recording medium capable of generating an illusion image from an arbitrary original image, a medium that displays an illusion image, and image data for reproducing the illusion image. More specifically, according to the present invention, for example, if flyers, fans, cards, or the like are distributed on which the characters of a company's name, product name, or the like, figures, or the like that create a floating illusion are printed, it is possible to increase the advertising effect for the company or the like; therefore, the present invention is useful in fields such as the advertising industry. Moreover, it is possible to provide illusion images as entertainment products, such as a picture book, or enjoy illusion images by floating greetings, names, or the like on New Year's cards, Christmas cards, business cards, or the like; therefore, the present invention is extremely useful in toy-related fields, printing-related fields, and the like. Moreover, for cell phones, such as smartphones, touchscreen personal computers, or the like, it is possible to provide an application with which, when a user captures a favorite image or character string or draws it on the screen, this can be converted to a floating illusion or a floating illusion image thereof can be printed; therefore, the present invention is extremely useful also in software-related fields and the like. Moreover, if a floating illusion image is displayed on the screen, display, or the like, pedestrians can see the image as if it is floating.

OTHER EMBODIMENTS

The embodiment of the present invention has been described above, and the present invention can be implemented by various different embodiments within the scope of the technical idea described in the claims in addition to the above-described embodiment.

For example, an explanation is given of the case where the illusion image generating apparatus 100 performs the processing in stand-alone mode as an example; however, the illusion image generating apparatus 100 may perform the processing in response to a request from a client terminal (cabinet different from the illusion image generating apparatus 100) and return the processing results to the client terminal. For example, the illusion image generating apparatus 100 may be configured as an ASP server, receive the original image data transmitted from a user terminal via the network 300, and return the reconstructed image data for the floating illusion image processed on the basis of this original image data to the user terminal.

Moreover, among the processings described in the embodiment, all or part of the processings described as automatic processing may be performed manually and all or part of the processings described as manual processing may be performed automatically by well-known methods.

In addition thereto, the processing procedures, the control procedures, the specific names, the information including registered data of each processing and parameters, such as retrieval conditions, the screen examples, and the database configurations, described in the literature and drawings above may be arbitrarily modified unless otherwise indicated.

Furthermore, each component of the illusion image generating apparatus 100 illustrated in the drawings is formed on the basis of functional concept, and is not necessarily configured physically the same as those illustrated in the drawings.

For example, all or any part of the processing functions that the devices in the illusion image generating apparatus 100 have, and particularly each processing function performed by the control unit 102, may be implemented by a CPU (Central Processing Unit) and a program interpreted and executed by the CPU, or may be implemented as hardware by wired logic. The program is recorded in a recording medium, which will be described later, and is mechanically read by the illusion image generating apparatus 100 as necessary. Specifically, the storing unit 106, such as a ROM and an HDD, or the like records a computer program for providing instructions to the CPU in cooperation with the OS (Operating system) and for executing various processings. This computer program is executed by being loaded into a RAM and configures the control unit in cooperation with the CPU.

Moreover, this computer program may be stored in an application program server that is connected to the illusion image generating apparatus 100 via the arbitrary network 300, and all or part thereof may be downloaded as necessary.

Furthermore, the program according to the present invention may be stored in a computer-readable recording medium and may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blue-ray Disc.

Moreover, the "program" refers to a data processing method written in any language and any description method and is not limited to a specific format, such as source codes and binary codes. The "program" is not necessarily configured unitarily and includes a program constituted in a dispersed manner as a plurality of modules and libraries and a program that implements its functions in cooperation with a different program representative of which is an OS (Operating System). Well-known configurations and procedures can be used for the specific configuration and reading procedure for reading a recording medium, the installation procedure after reading a recording medium, and the like in each device illustrated in the present embodiment.

Various databases and the like (the framelet file 106a to the image data file 106b) stored in the storing unit 106 are a storage unit, examples of which is a memory device, such as a RAM and a ROM, a fixed disk drive, such as a hard disk, a flexible disk, and an optical disk, and stores various programs, tables, databases, files for web pages, and the like that are used for various processings or providing websites.

Moreover, the illusion image generating apparatus 100 may be configured as an information processing apparatus, such as well-known personal computer and workstation, or may be configured by connecting an arbitrary peripheral device to the information processing apparatus. Moreover, the illusion image generating apparatus 100 may be realized by installing software (including program, data, and the like) that causes the information processing apparatus to realize the method in the present invention.

A specific form of distribution/integration of the devices is not limited to those illustrated in the drawings and it may be configured such that all or part thereof is functionally or physically distributed or integrated, by arbitrary units, depending on various additions or the like or depending on functional load. In other words, the above-described embodiments may be performed by arbitrarily combining them with each other or the embodiments may be selectively performed.

REFERENCE SIGNS LIST 100 illusion image generating apparatus
102 control unit
102a decomposing unit
102b reconstructing unit
102c floating illusion creating unit
102d color space conversion unit
102e illusion image output unit
104 communication control interface unit
106 storing unit
106a framelet file
106b image data file
108 input/output control interface unit
112 input device
114 output device
200 external system
300 network

The invention claimed is:

1. A printed illusion image printed by a printer on a print medium, wherein
   a predetermined component is attenuated or amplified among components extracted and reconstructed by filters with respective orientations or components with respective orientations, which include wavelet components with respective orientations;
   the components compose an original image; and the illusion image creates an illusion of floating due to the movement of the image or the viewer, and appears to move differently from the actual movement accompanied by the movement of the viewer or the movement of the image.

2. The printed illusion image according to claim 1, wherein:
an illusion of wavering in a lateral direction is created when the movement is longitudinal;
an illusion of wavering in a longitudinal direction is created when the movement is lateral; or
both.

3. The printed illusion image according to claim 1, wherein the illusion image has floating directions different from each other in image regions adjacent to each other.

4. The printed illusion image according to claim 3, wherein:
the image regions waver laterally in opposite directions to each other when the movement is longitudinal; or
the image regions waver longitudinally in opposite directions to each other when the movement is lateral.

5. The printed illusion image according to claim 1, wherein the print medium is paper or an OHP sheet.

6. The printed illusion image according to claim 1, wherein the print medium is a flyer, a fan, a card, or a picture book.

7. A printed illusion image printed by a printer on a print medium, wherein:
the illusion image is a sum of subband signals;
the subband signals are results of a multiresolution decomposition performed on original image data by a wavelet frame with orientation selectivity or a filterbank with orientation selectivity that is a set of an approximate filter with no orientation and a plurality of detail filters with respective orientations;
a subband signal corresponding to at least one of detail filters with a predetermined orientation relative to a floating direction, in which an image is desired to be floated due to an illusion, among the detail filters is attenuated or amplified; and
the illusion image creates an illusion of floating due to the movement of the image or the viewer, and appears to move differently from the actual movement accompanied by the movement of the viewer or the movement of the image.

8. The printed illusion image according to claim 7, wherein:
an illusion of wavering in a lateral direction is created when the movement is longitudinal;
an illusion of wavering in a longitudinal direction is created when the movement is lateral; or
both.

9. The printed illusion image according to claim 7, wherein the illusion image has floating directions different from each other in image regions adjacent to each other.

10. The printed illusion image according to claim 9, wherein:
the image regions waver laterally in opposite directions to each other when the movement is longitudinal; or
the image regions waver longitudinally in opposite directions to each other when the movement is lateral.

11. The printed illusion image according to claim 7, wherein the print medium is paper or an OHP sheet.

12. The printed illusion image according to claim 7, wherein the print medium is a flyer, a fan, a card, or a picture book.

13. A non-transitory computer-readable recording medium on which an image data for displaying an illusion image is recorded, the illusion image produced from original image data by:
obtaining subband signals by performing a multiresolution decomposition on the original image data by a wavelet frame with orientation selectivity or a filterbank with orientation selectivity that is a set of an approximate filter with no orientation and a plurality of detail filters with respective orientations;
attenuating or amplifying a subband signal corresponding to at least one of detail filters with a predetermined orientation relative to a floating direction, in which an image is desired to be floated due to an illusion, among the detail filters; and
reconstructing an image by summing the subband signals;
wherein the illusion image creates an illusion of floating due to the movement of the image or the viewer, and appears to move differently from the actual movement accompanied by the movement of the viewer or the movement of the image.

14. The non-transitory computer-readable recording medium according to claim 13, wherein:
an illusion of wavering in a lateral direction is created when the movement is longitudinal;
an illusion of wavering in a longitudinal direction is created when the movement is lateral; or
both.

15. The non-transitory computer-readable recording medium according to claim 13, wherein the illusion image has floating directions different from each other in image regions adjacent to each other.

16. The non-transitory computer-readable recording medium according to claim 15, wherein:
the image regions waver laterally in opposite directions to each other when the movement is longitudinal; or
the image regions waver longitudinally in opposite directions to each other when the movement is lateral.

17. The non-transitory computer-readable recording medium according to claim 13, wherein the image data is two-dimensional image data in a raster format or a vector format.

* * * * *